(12) United States Patent
Satoh

(10) Patent No.: US 6,583,910 B1
(45) Date of Patent: Jun. 24, 2003

(54) OPTICAL TRANSMITTER AND OPTICAL COMMUNICATION SYSTEM USING THE SAME

(75) Inventor: Hideaki Satoh, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/280,551

(22) Filed: Mar. 30, 1999

(51) Int. Cl.[7] ............................................... H04B 10/04
(52) U.S. Cl. ....................... 359/180; 359/181; 359/187; 359/110; 359/239; 359/245
(58) Field of Search ................................. 359/180, 187, 359/110, 239, 181, 245

(56) References Cited

U.S. PATENT DOCUMENTS 5,706,117 A * 1/1998 Imai et al. ................. 359/187
5,917,637 A * 6/1999 Ishikawa et al. ............ 359/181
5,963,357 A * 10/1999 Kubota et al. .............. 359/239
6,229,631 B1 * 5/2001 Sato et al. .................. 359/110

* cited by examiner

Primary Examiner—Leslie Pascal
Assistant Examiner—Hanh Phan
(74) Attorney, Agent, or Firm—Venable; Robert Frank; Jeffri A. Kaminski

(57) ABSTRACT

An optical transmitter includes a light source emitting input light; and a modulator modulating the input light in accordance with an input electric signal to generate an optical transmission signal. The transmitter also includes a monitor which detects frequency fluctuation of the optical transmission signal. The modulator is controlled so as to optimize the amount of frequency fluctuation of the optical transmission signal.

15 Claims, 25 Drawing Sheets

SPECTRUM

BEFORE → TRANSMISSION → AFTER

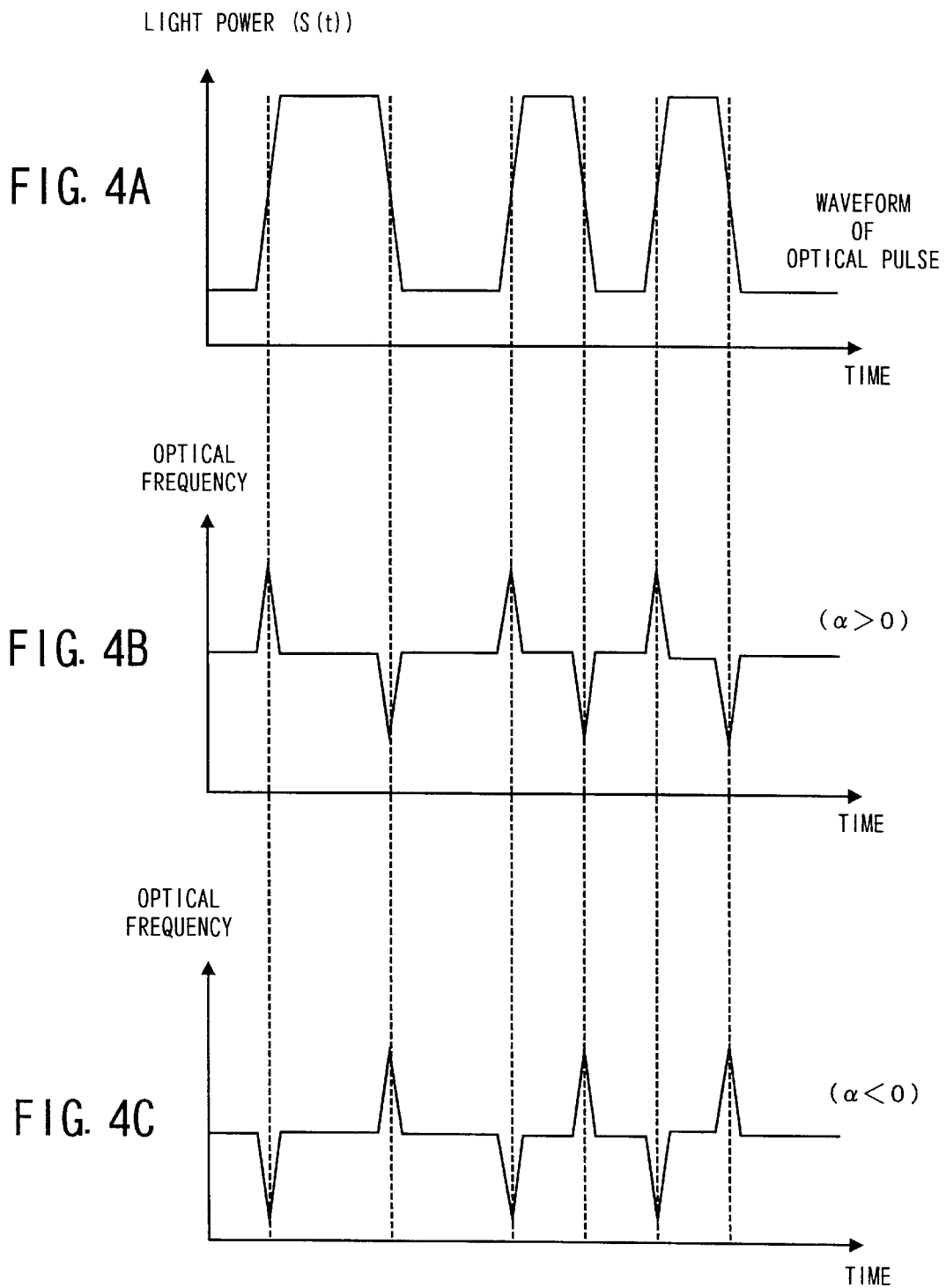

PRIOR ART

OPTICAL TRANSMITTER AND OPTICAL COMMUNICATION SYSTEM USING THE SAME

CROSS REFERENCE TO RELATED APPLICATION

This application claims the priority of Application No. H10-116935, filed Apr. 27, 1998 in Japan, the subject matter of which is incorporated herein by reference.

TECHNICAL FIELD OF THE INVENTION

The present invention relates to an optical transmitter using an optical modulator, and more particularly to, an optical transmitter and optical communication system in which the waveform of output light supplied from the optical transmitter is sufficiently optimized.

BACKGROUND OF THE INVENTION

In recent years, a network for a basic trunk system is required to transmit signals at a high transmission rate of more than 10 Gbits/s, as a large amount of data, such as image data, is increasingly transmitted. In order to realize such high rate transmission, it is required to modulate input light (carrier) at a high speed. Many methods for realizing high rate transmission have been proposed.

According to a conventional method, a semiconductor laser is directly modulated. However, when the semiconductor laser is modulated at a rate more than 10 Gbit/s, chirping (waveform deformation) occurs in transmission lines. In other words, transmitted light is deformed due to wavelength dispersion of the optical fibers.

A conventional optical transmitter includes a Mach-Zehnder type of optical modulator using LiNbO$_3$ crystal as a light source, hereinafter called LN modulator. Such an optical transmitter is described, for example, in Japanese Patent Laying Open H4-192729 and Technical Report "Optical Transmitting/Receiving Module" FUJITSU 48.5, pp451–456 (09, 1997). According to this kind of optical transmitter, the modulator is required to be driven with driving voltage (modulating voltage) having high amplitude of 4 Vpp to 5 Vpp. In addition, a control circuit, so-called DC drift circuit, is required to compensate the fluctuation of input/output characteristics of the transmitter. Therefore, it is difficult to make the optical transmitter small in size.

For resolving the above mentioned problems, EA (Electro-Absorption) optical modulators have been used. EA optical modulators absorb input light in response to an applied voltage. Such an EA optical modulator is, for example, described in Report of Electro Information Communication Society, LQE95-17 (1995-06) by Yamada et al. and Report of Electro Information Communication Society, 1997 meeting B-10-195, by Takashima et al. In those reports, an optical modulator is integrated with a laser diode of distribution feedback type (DFB-LD) so as to provide a small size of transmitter and to have high power output.

A modulator in which Chirp parameter (coefficient) α is controlled to be a desirable value is described in Japanese Laying Open H9-179097. According to an optical transmission system described in Japanese Patent Laying Open H9-179079, transmission characteristics are monitored and chirp parameter α of an EA optical modulator is controlled in response to the monitored values. According to this system, the chirp parameter α is calculated based on the amount of frequency fluctuation that occurs when light is modulated with a low level signal. In other words, the chirp parameter α is merely an approximation, which is a static value. Therefore, it is difficult to compensate waveform deterioration sufficiently when the system is actually used, especially when optical fibers having a wavelength dispersion characteristic are employed.

OBJECTS OF THE INVENTION

Accordingly, an object of the present invention is to provide an optical transmitter which outputs transmission light having the optimum amount of optical frequency fluctuation.

Another object of the present invention is to provide an optical communication system in which transmission light has the optimum amount of optical frequency fluctuation.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to the present invention, the amount of optical frequency fluctuation of a transmission signal is dynamically monitored. The amount of frequency fluctuation, which corresponds to the chirp parameter, is optimized in response to the monitored value. As a result, waveform deterioration of transmission signals is sufficiently compensated.

According to a first aspect of the present invention, an optical transmitter includes a light source emitting input light; and a modulator modulating the input light in accordance with an input electric signal to generate an optical transmission signal. The transmitter also includes a monitor which detects the amount of frequency fluctuation of the optical transmission signal. The modulator is controlled so as to optimize the amount of frequency fluctuation of the optical transmission signal.

According to a second aspect of the present invention, an optical transmitter includes a light source which emits input light for transmission; and an EA (Electro-Absorption) type of optical modulator which absorbs the input light in response to an applied voltage to power-modulate the input light, so that an optical transmission signal is generated. The optical transmitter further includes a bias circuit which applies a bias voltage to the optical modulator; a driver circuit which generates a driving signal (modulating signal) to drive the optical modulator; a control circuit which controls the output power of the light source and the amplitude of a waveform of the driving signal; and an optical frequency fluctuation monitor which detects the amount of frequency fluctuation of the optical transmission signal. The optical modulator is controlled so as to optimize the amount of frequency fluctuation of the optical transmission signal.

According to a third aspect of the invention, an optical transmitter includes a light source which emits input light for transmission; and a Mach-Zehnder type of optical modulator which power-modulates the input light to generate an optical transmission signal, and is provided with first and second electrodes. The optical transmitter further includes a first driver circuit which supplies a modulation signal to the first electrode of the optical modulator; a second driver circuit which supplies a modulation signal to the first electrode of the optical modulator; a bias circuit which applies a bias voltage to each of the first and second electrodes of the optical modulator.

The optical transmitter further includes a control circuit which controls the output power of the light source and the driving amplitude of output waveform of each of the first and second driver circuits; and an optical frequency fluctuation monitor which detects the amount of frequency fluctuation of the optical transmission signal. The control circuit controls at least one of output amplitudes of the first and second driver circuits and levels of the bias voltages applied to the first and second electrodes of the optical modulator.

According to another aspect of the invention, any one of the above described optical transmitters is used in an optical transmission system.

BRIEF DESCRIPTION OF THE DRAWINGS

FIGS. 4A–4C are graphs showing the relation between waveforms of optical pulses and frequency fluctuation of transmission light.

DETAILED DISCLOSURE OF THE INVENTION

For better understanding of the present invention, conventional technology is first described. First, the necessity of optimizing a chirp parameter $\alpha$ is explained. There are two typical optical fibers having different dispersion characteristics. One has a zero-dispersion wavelength of 1.3 $\mu$m, and the other has a zero-dispersion wavelength of 1.5 $\mu$m. According to ITU-T (International Telecommunication Union-Telegraph and Telephone), they are classified into G-652 and G.653, respectively.

Figure 1:
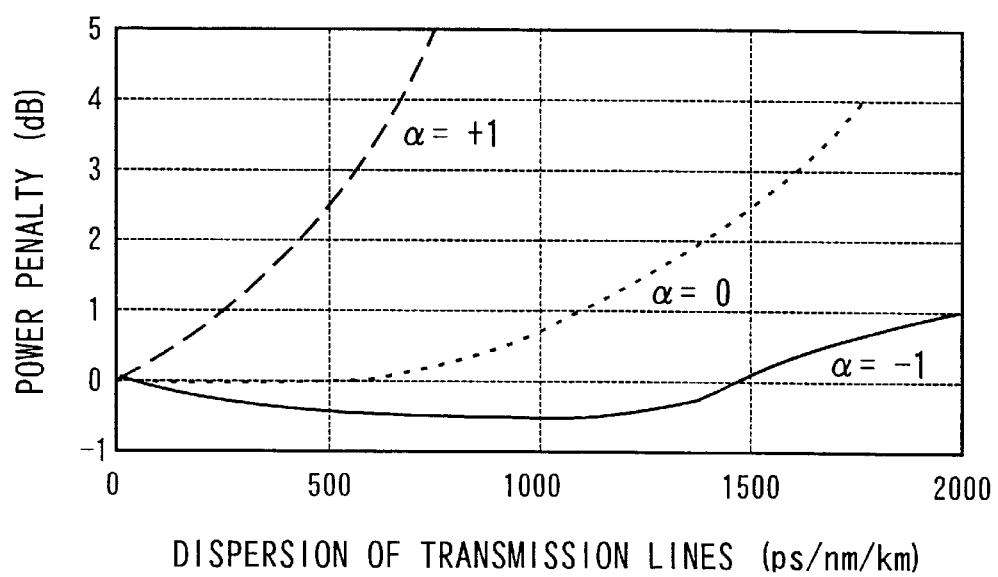
FIG. 1 is a graph showing the characteristics of power penalty for optical fibers, G.652.
Figure 2:
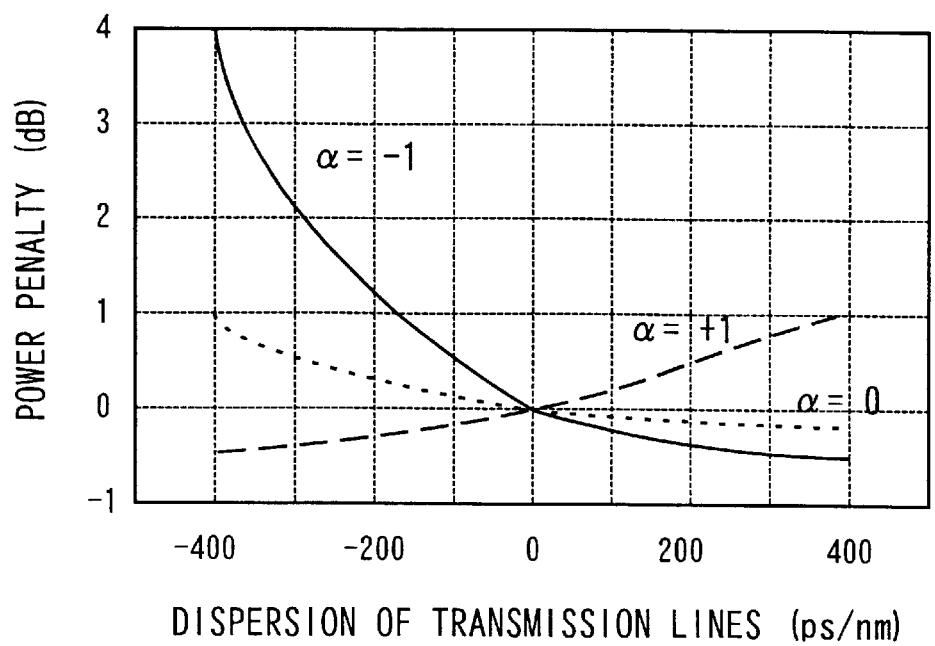
FIG. 2 is a graph showing the characteristics of power penalty for optical fibers, G.653.

FIGS. 1 and 2 show power penalty characteristic relative to dispersion of optical fibers when using optical fibers of G.652 and G.653, respectively. In the cases of FIGS. 1 and 2, a light source supplies light having a wavelength of 1.5 $\mu$m. As shown in FIG. 1, when using an optical fiber of G.652, power penalty is small when chirp parameter $\alpha$ is in a range between −0.5 and −1.0. Contrarily, as shown in FIG. 2, when using an optical fiber of G.653, power penalty is small when chirp parameter $\alpha$ is around +0.5. Consequently, it can be understood from FIGS. 1 and 2, that chirp parameter $\alpha$ should be regulated in accordance with the type of optical fibers to prevent waveform deformation of transmission light.

The above mentioned result is caused by the fact that deformation of transmission signals varies in accordance with wavelength dispersion of the optical fibers.

Figure 3A:
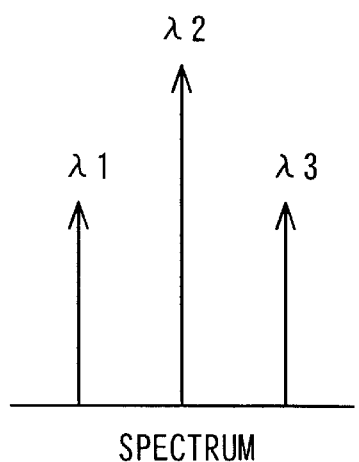
FIG. 3 is a diagram showing waveform deterioration of transmission light.
Figure 3B:
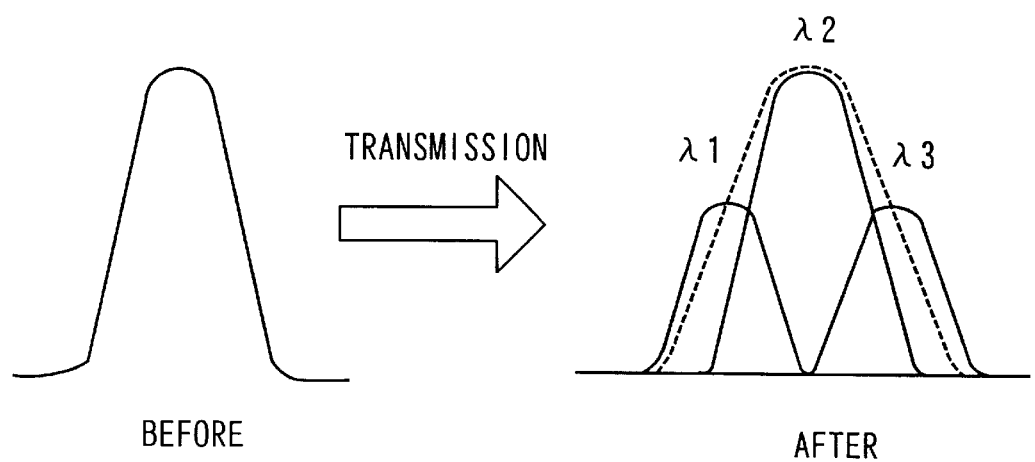

Now taking an example in that a spectrum of a light source has components of $\lambda 1$, $\lambda 2$ and $\lambda 3$, as shown in FIG. 3A. With optical fibers of G.652, transmission light is much dispersed at 1.5 $\mu$m band, so that delay time of transmission much depends on the wavelength. As a result, waveform of the transmission light is broadened (widened) after transmission, as shown by the broken line in FIG. 3B. On the other hand, with optical fibers of G.653, transmission light is not dispersed so much at 1.5 $\mu$m band, so that waveform of the transmission light does not change a lot, as shown by the solid line in FIG. 3B.

Next, deterioration of waveform when chirping occurs will be explained in conjunction with FIGS. 4–6.

FIG. 4A shows the waveform of transmission light pulses. FIGS. 4B and 4C show fluctuation of optical frequency of the transmission light pulses relative to time.

Figure 5:
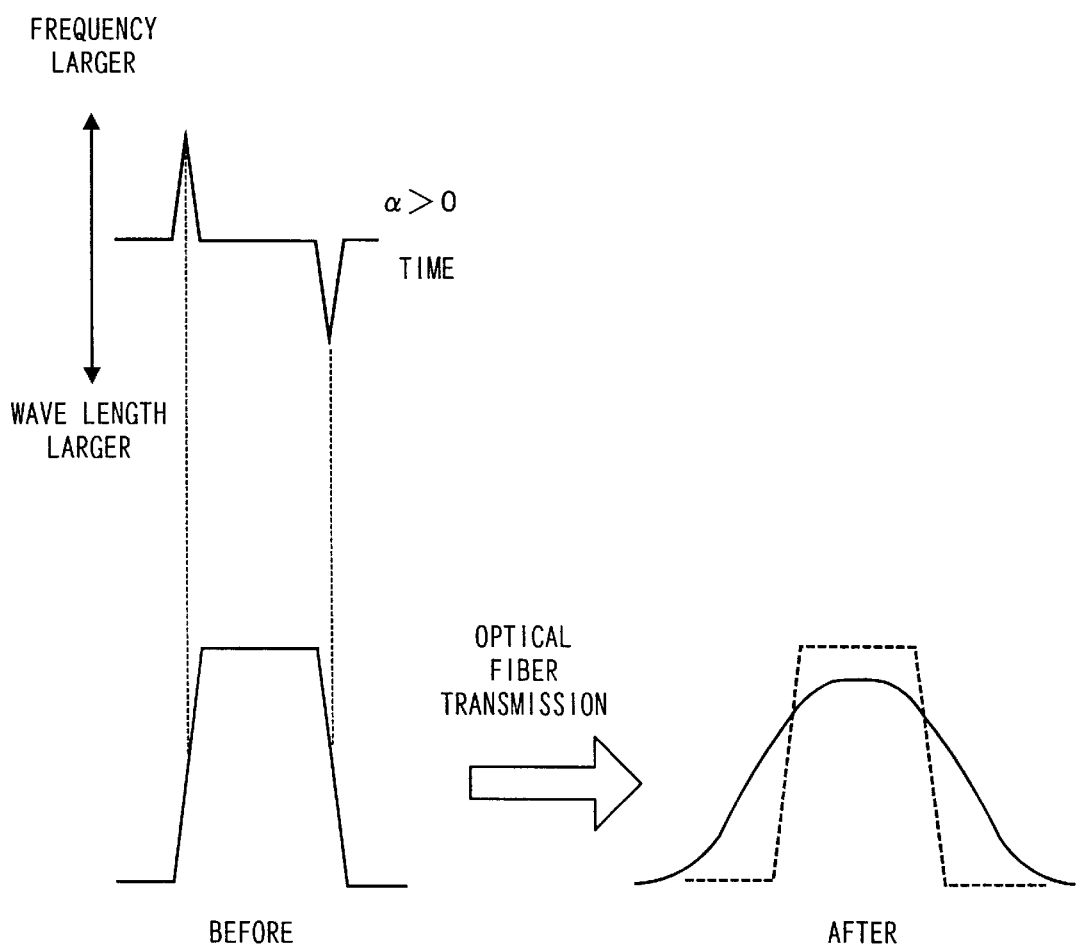
FIG. 5 is a diagram showing waveform deterioration of transmission light due to chirping in one case.
Figure 6:
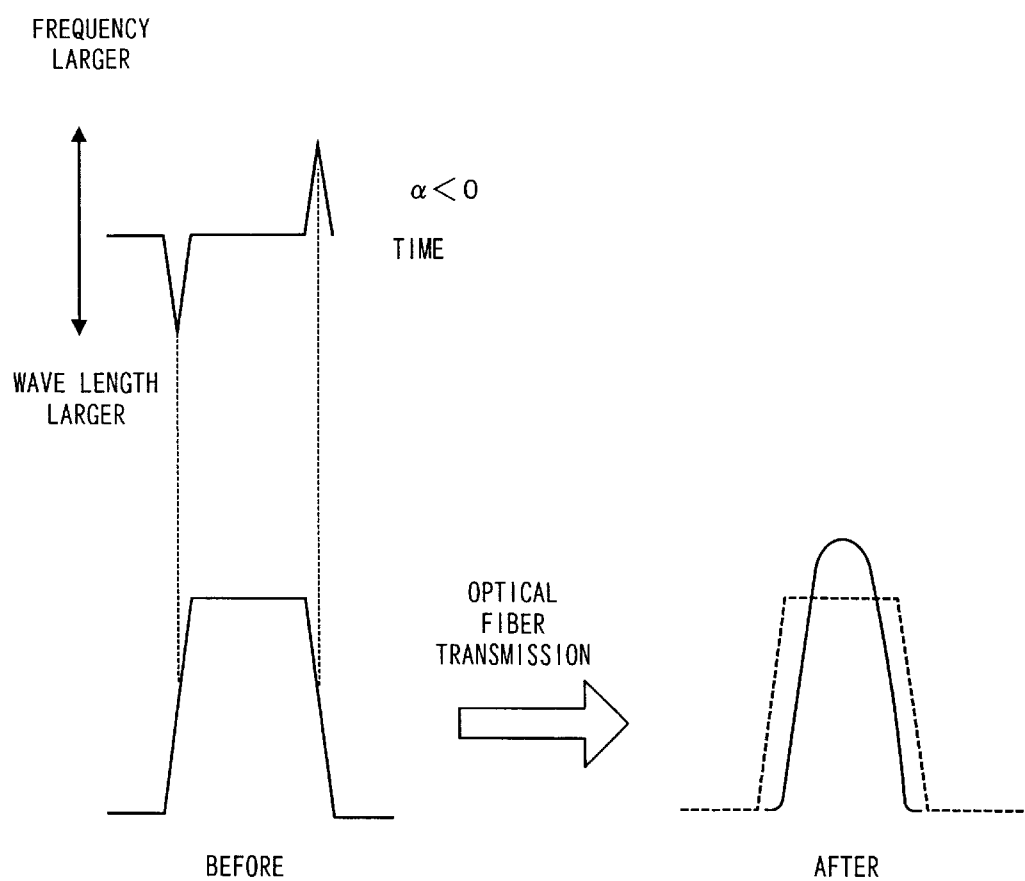
FIG. 6 is a diagram showing waveform deterioration of transmission light due to chirping in another case.

For easy understanding, fluctuation of wavelength is replaced by fluctuation of optical frequency, when describing FIGS. 4–6. The amount of optical frequency fluctuation Δf is represented by the following formula (1):

$$\Delta f = (\alpha/4\pi)(1/S(t))(dS(t)/dt) \quad (1)$$

As shown in FIG. 4B, when chirp parameter α is larger than zero, the amount of optical frequency fluctuation Δf is larger than zero when the light power of the pulse is increasing. The amount of optical frequency fluctuation Δf is smaller than zero when the light power of the pulse is decreasing. The phenomenon shown in FIG. 4B is the so-called "red-shift".

Contrarily, as shown in FIG. 4C, when chirp parameter α is smaller than zero, the amount of optical frequency fluctuation Δf is smaller than zero the light power of the pulse is increasing. The amount of optical frequency fluctuation Δf is larger than zero when the light power of the pulse is decreasing. The phenomenon shown in FIG. 4C is the so-called "blue-shift".

For instance, when chirp parameter α is larger than zero, optical frequency is large (light wavelength becomes small) when the light power is increasing, as shown in FIG. 5. When optical fibers G.652 having large dispersion are used, the delay time is shorter as wavelength is shorter. As a result, the transmitted waveform has a long delay time during which the light power is increasing and has a short delay time during which the light power is decreasing. Therefore, the transmission light pulse is broadened in width after transmission.

Contrarily, when chirp parameter α is smaller than zero, optical frequency is small (light wavelength becomes large) during the light power is increasing, as shown in FIG. 6. Therefore, the transmission light pulse is narrowed after transmission.

According to the above described study, the dependency of power penalty (power loss) of optical fibers, shown in FIGS. 1 and 2, can be explained as follows:

Optical fibers of G.652 are affected by wavelength dispersion, and the transmitted waveform tends to be broadened after transmission, as shown in FIG. 5. When modulation is carried out with a chirp parameter α that is less then zero, the broadened pulse is offset, as shown in FIG. 6. The penalty is small when chirp parameter α is set to be −1.

Contrarily, optical fibers of G.653 are not affected by wavelength dispersion so much, and the transmitted waveform tends not to be broadened so much. For that reason, if modulation is carried out with a chirp parameter α that is less than zero, the pulse is narrowed too much, and penalty becomes large. To provide an optimum waveform, modulation is carried out with a chirp parameter in a range between zero to +0.5.

Figure 7:
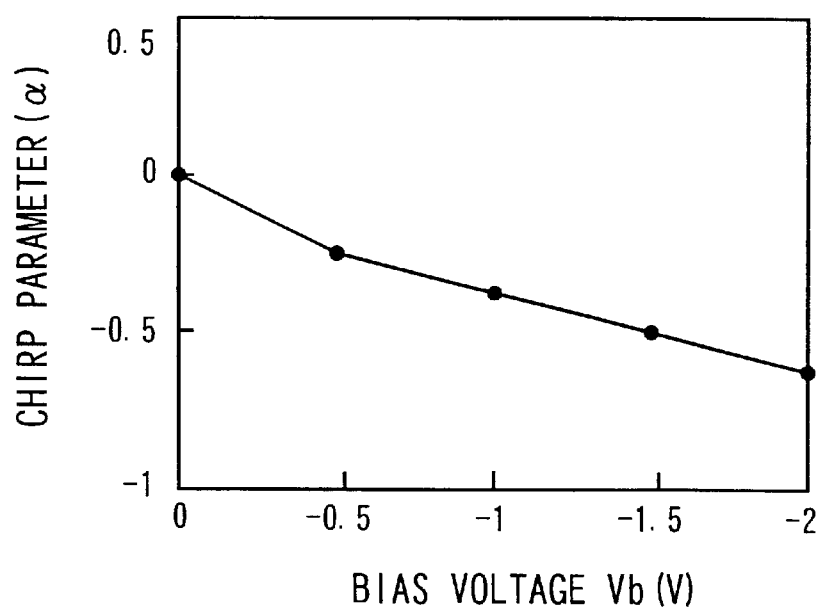
FIG. 7 is a diagram showing the dependency of chirp parameter on a bias voltage applied to the modulator.

FIG. 7 shows fluctuation of chirp parameter relative to a bias voltage applied to an EA optical modulator. As shown in FIG. 7, chirp parameter α changes in response to the bias voltage applied to the EA optical modulator. The chirp parameter α is getting smaller as the bias voltage is getting larger.

Figure 8:
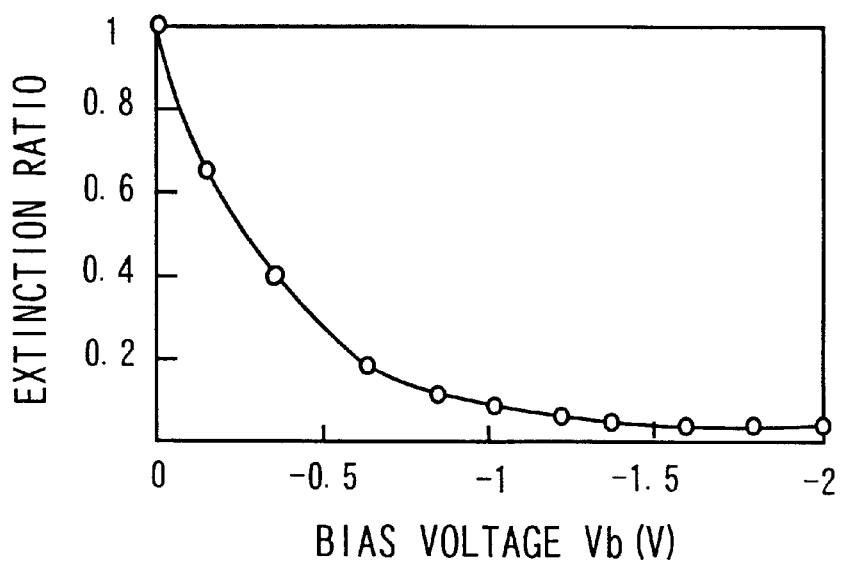
FIG. 8 is a diagram showing the dependency of extinction ratio on a bias voltage applied to the modulator.

FIG. 8 shows fluctuation of the extinction ratio of an EA optical modulator relative to a bias voltage applied to the modulator. As shown in FIG. 8, the extinction ratio changes in response to the bias voltage. The extinction ratio does not decrease linearly, but in the manner of exponential function as the bias voltage is getting larger.

Figure 9:
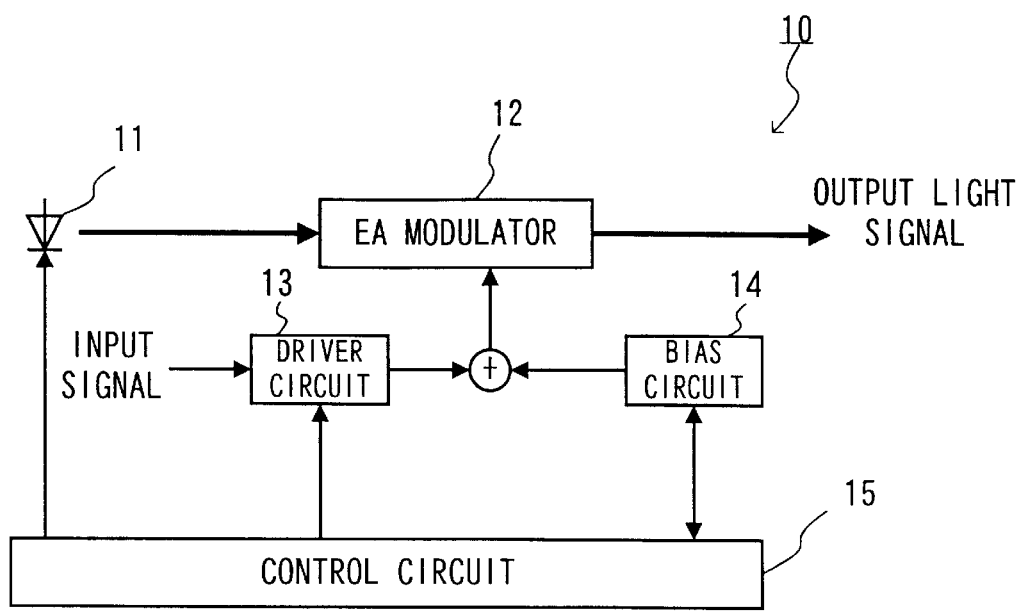
FIG. 9 is a block diagram showing a conventional optical transmitter.

FIG. 9 shows a conventional optical transmitter 10 in which a chirp parameter α can be controlled to be a desirable value. The optical transmitter 10 includes a light source 11, which may be a semiconductor laser, an EA optical modulator 12, a driver circuit 13, a bias circuit 14 and a control circuit 15.

The light source 11 emits light that is to be modulated by an information-bearing signal. The EA optical modulator 12 is of Mach-Zehnder type and is supplied with the light emitted by the light source 11. The driver circuit 13 amplifies an electric input signal (information-bearing signal) to produce a drive signal (modulation signal) to be supplied to the EA optical modulator 12. The EA optical modulator 12 is driven in response to the driving signal supplied from the driver circuit 13. The bias circuit 14 generates a bias voltage to be supplied to the EA optical modulator 12. The control circuit 15 is connected to the light source 11, the driver circuit 13 and the bias circuit 14, so as to control them properly.

The light source 11 is a semiconductor laser that emits a specific wavelength of optical signals, for example, DFB (Distributed Feedback Laser). The EA optical modulator 12 power-modulates the input light emitted by the light source 11. The driver circuit 13 supplies electric signals in the opposite logic to a pair of electrodes of the EA optical modulator 12. The bias circuit 14 controls bias voltage to be applied to the electrodes of the EA optical modulator 12. The control circuit 15 controls the amplitude of modulating waveform to be supplied to each of the electrodes of the EA optical modulator 12 independently. The optical transmitter 10 is designed to be able to control the chirp parameter α with an outside circuit.

According to the optical transmitter 10, light emitted by the light source 11 is supplied to the EA optical modulator 12 and is power-modulated. The EA optical modulator 12 modulates the input light (optical carrier) by the electric signal (information-bearing signal), which has been amplified by the driver circuit 13. The bias circuit 14 supplies a bias voltage that is controlled so as to optimize the chirp parameter α of the EA optical modulator 12. The control circuit 15 controls the light source 11 and the driver circuit 13 so that the power, waveform and extinction ratio of an output light (optical transmission signal) are prevented from been changed in response to the change of the bias voltage.

Figure 10:
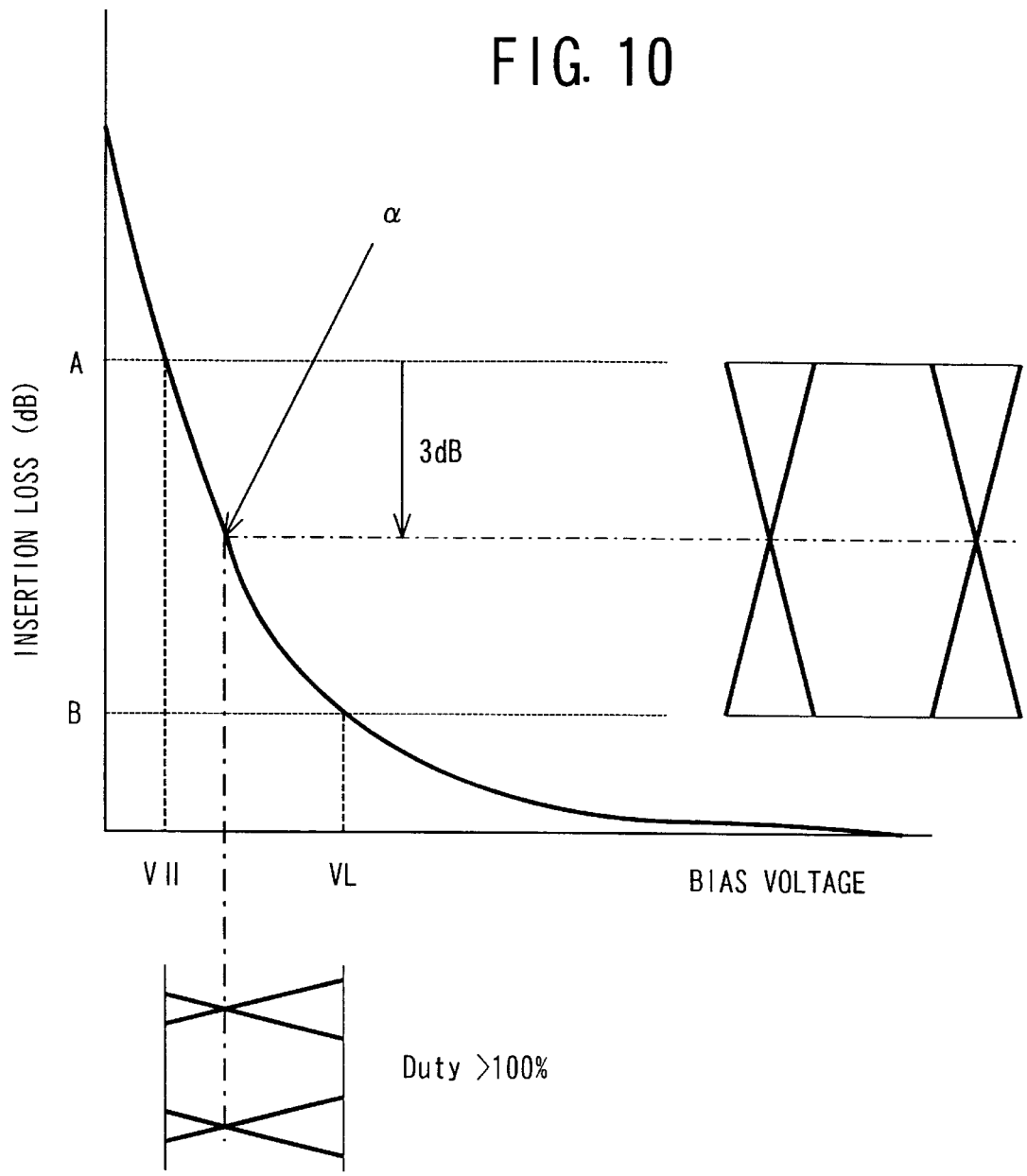
FIG. 10 is a graph used for explaining the operation of an EA optical modulator provided in the conventional optical transmitter, shown in FIG. 9.

As shown in FIG. 10, as the absolute value of the bias voltage is getting larger, the power of the output light is decreased in the manner of an exponential function. The degree of the change of the light power varies from device to device. Such change of light power is one of the fundamental characteristics of EA optical modulators.

As shown in FIG. 10, when the bias voltage of the EA optical modulator 12 is changed to provide a desirable chirp parameter α, the duty of the waveform, extinction ratio and light power of the output light is changed as well. Extinction ratio is a ratio of light power between emission mode and non-emission mode. For that reason, when the bias voltage applied to the EA optical modulator 12 is changed, it is required to regulate the amplitude and duty of a driving signal and bias current to be applied to the light source 11.

The conventional optical transmitter 10 includes a ROM that stores for each bias voltage control parameters, which are used for regulating the amplitude and duty of a driving signal and bias current of the light source 11. Further, the system includes an optical receiver that monitors error rate and Q factor of the transmitted light, and supplies the detected data back to the optical transmitter. In response to the feedback data, transmission characteristics are optimized for each transmission line having different dispersion characteristic.

However, according to the above described conventional optical transmitter, the following disadvantages have arisen;

The chirp parameters α is calculated based on the amount of frequency fluctuation that occurs when light is modulated with a low level signal. In other words, the chirp parameters α is obtained as merely an index, approximation, or the average, each of which is a status value. In practice, the chirp parameter α of the optical modulator, which is corresponding to the amount of frequency fluctuation, changes in a dynamic manner.

In an optical transmission system described in Japanese Patent Laying Open H9-179079, transmission characteristics are monitored and chirp parameter α of an EA optical modulator is controlled in response to the monitored values. According to this system, the chirp parameter α is calculated based on the amount of frequency fluctuation that occurs when light is modulated with a low level signal. In other words, the chirp parameter α is merely an approximation, which is a static value. Therefore, it is difficult to compensate waveform deterioration enough when the system uses optical fibers having a wavelength dispersion characteristic.

The present invention is applicable to a basic trunk transmission system, an optical subscriber network system and the like.

First Preferred Embodiment

Figure 11:
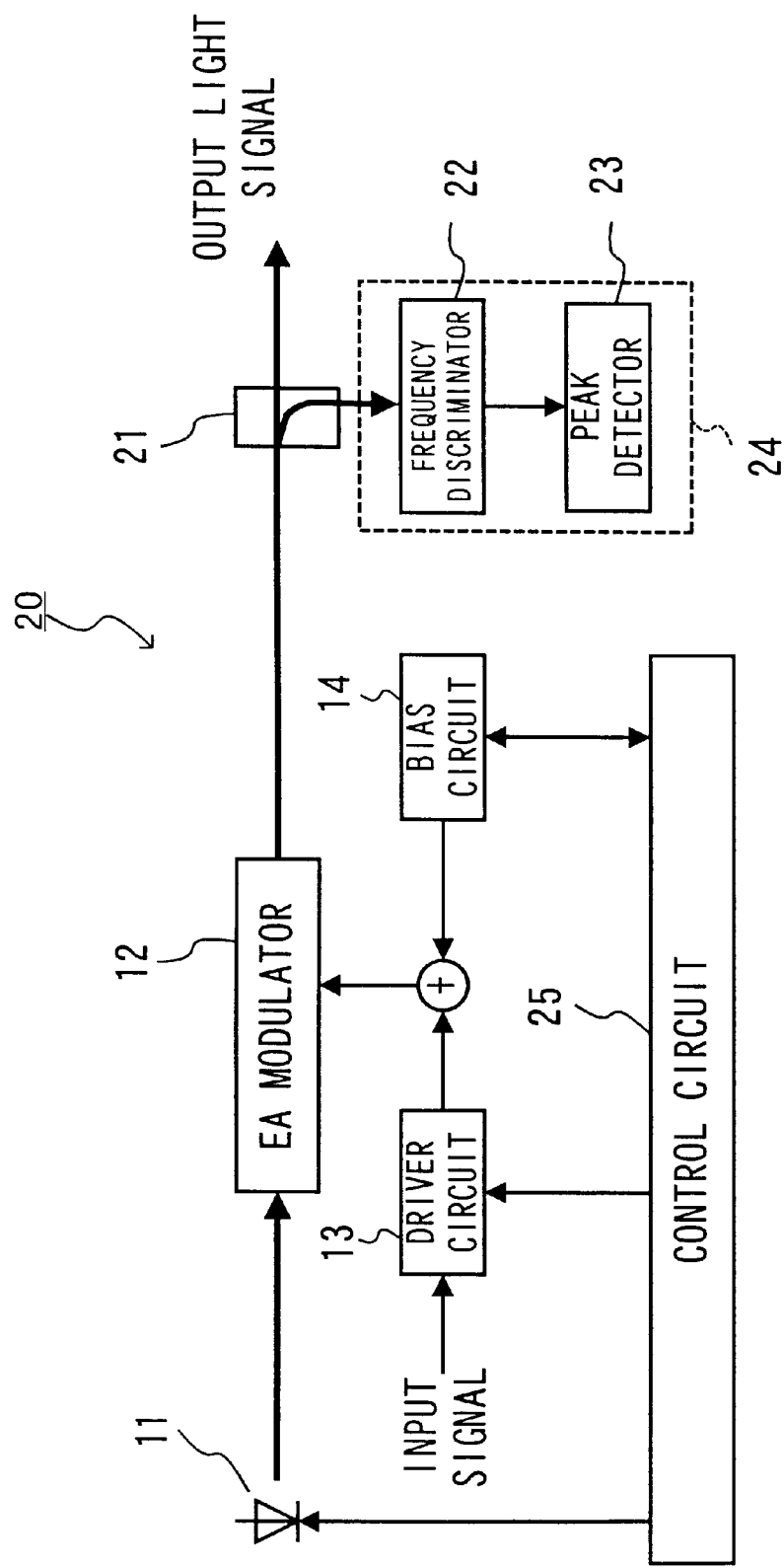
FIG. 11 is a block diagram showing an optical transmitter according to a first preferred embodiment of the present invention.

FIG. 11 shows an optical transmitter 20 according to a first preferred embodiment of the present invention, in which chirp parameter α can be controlled properly. In this embodiment, the same or corresponding components to those in the above described optical transmitter, shown in FIG. 9 are represented by the same reference numerals.

The optical transmitter 20 includes a light source 11, which may be a semiconductor laser; an EA optical modulator 12; a driver circuit 13; a bias circuit 14; an optical coupler 21; an optical frequency fluctuation monitor 24 for monitoring fluctuation of optical frequency of output light; and a control circuit 25. The optical frequency fluctuation monitor 24 includes an optical frequency discriminator 22 and a peak detector 23.

The light source 11 emits light that is to be modulated by an information-bearing signal. The EA optical modulator 12 is of Mach-Zehnder type and is supplied with the light emitted by the light source 11. The driver circuit 13 amplifies an electric input signal (information-bearing signal) to produce a drive signal (modulation signal) to be supplied to the EA optical modulator 12. The EA optical modulator 12 is driven in response to the drive signal supplied from the driver circuit 13. The bias circuit 14 generates a bias voltage to be applied to the EA optical modulator 12. The control circuit 25 is connected to the light source 11, driver circuit 13 and the bias circuit 14, so as to control them properly.

The light source 11 is a semiconductor laser that emits a specific wavelength of optical signals, for example, DFB (Distributed Feedback Laser). The EA optical modulator 12 power-modulates the light emitted by the light source 11. The driver circuit 13 supplies electric signals in the opposite logic to a pair of electrodes of the EA optical modulator 12. The bias circuit 14 controls bias voltage to be applied to the electrodes of the EA optical modulator 12.

The optical coupler 21 splits (divides) output light supplied from the EA optical modulator 12 in accordance with its wavelength/direction. One of the divided lights is coupled to an optical fiber as a transmission signal, while the other light is supplied to the optical frequency discriminator 22.

Figure 12:
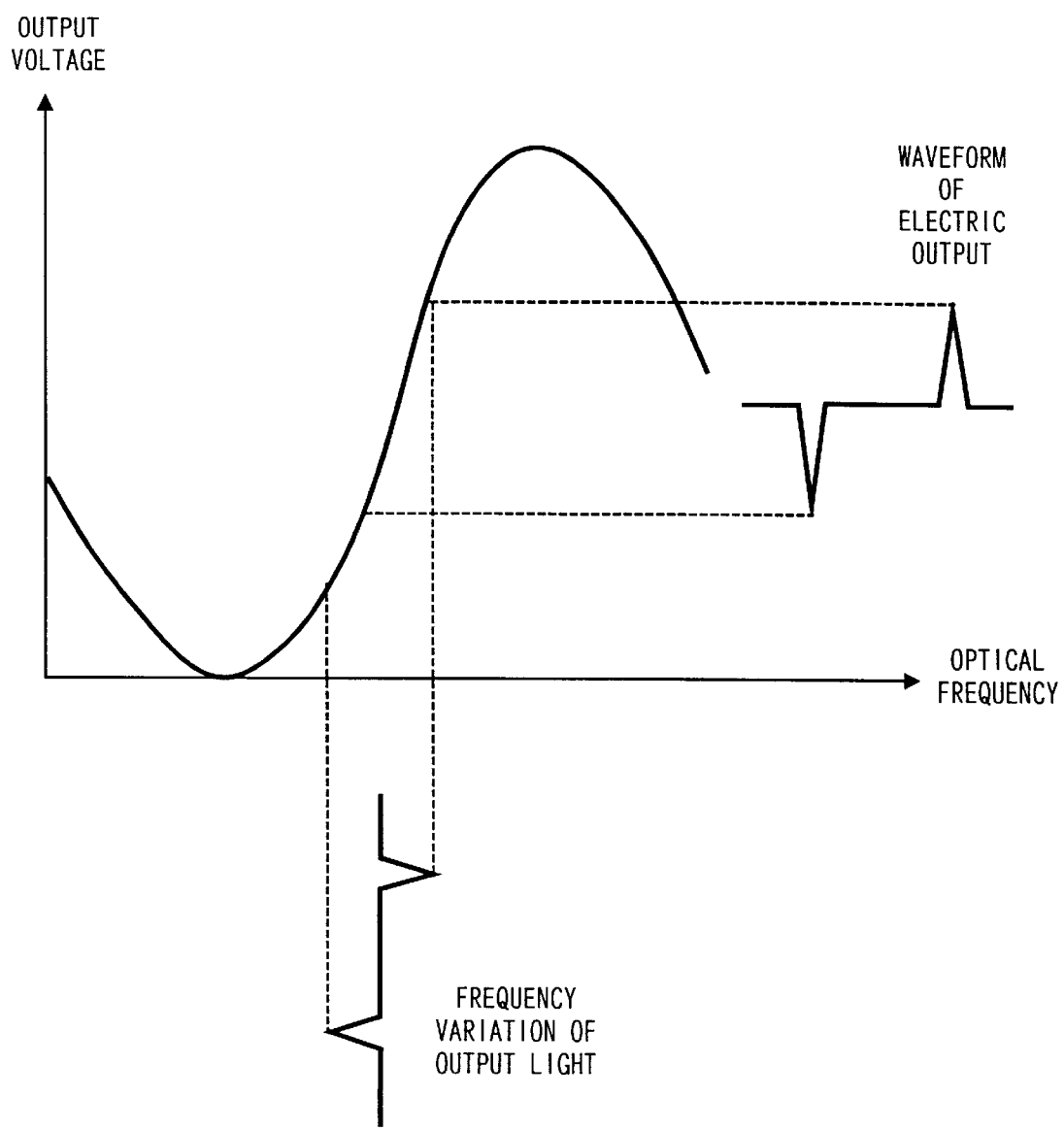
FIG. 12 is a graph showing discrimination characteristics of a frequency discriminator used in the optical, shown in FIG. 11.

The optical frequency discriminator 22 is, for example, an interferometer of Mach-Zehnder type, which has the discrimination characteristics shown in FIG. 12. As shown in FIG. 12, output voltage of the optical frequency discriminator 22 changes in level responding to the optical frequency of the optical signal (transmission light).

In response to the peaks of the output signal of the optical frequency discriminator 22, the peak detector 23 detects the peaks of frequency fluctuation of the transmission light signal.

As mentioned above, according to this embodiment, the optical signal supplied from the EA optical modulator 12 is split and one is supplied to the optical frequency discriminator 22. The optical frequency discriminator 22 detects optical frequency fluctuation, and then the peak detector 23 detects the peak value of frequency fluctuation of the transmission light signal (output light signal).

The control circuit 25 controls the amplitude of modulating waveform to be supplied to each of the electrodes of the EA optical modulator 12 independently.

In operation, light emitted by the light source 11 is supplied to the EA optical modulator 12 and is power-modulated. The EA optical modulator 12 modulates the light (optical carrier) by the electric signal (information-bearing signal), which has been amplified by the driver circuit 13.

The control circuit 25 controls, in response to the variation of the bias voltage, at least one of the output power of the light source 11, the amplitude of output waveform and the duty of the driver circuit 13.

In the same manner as the conventional system, the amount of optical frequency fluctuation depends on the bias voltage applied to the EA optical modulator 12. This is because chirp parameter α relates to the amount of optical frequency fluctuation as indicated by the above-mentioned formula (1). In order to optimize the amount of optical frequency fluctuation, the driving condition (operating parameters) of the EA optical modulator 12, such as the bias voltage and driving amplitude, is controlled.

As for driving condition of the EA optical modulator 12, as shown in FIG. 10, a bias voltage VL can be defined in response to the extinction ratio when a bias voltage VH has been set. When a certain amount of optical frequency fluctuation is determined, the bias voltages VH and VL and driving amplitude are automatically defined. When the duty of the transmission light is optimized (100%), the duty of driving waveform is defined.

In this embodiment, shown in FIG. 11, the control circuit 25 controls driving condition of the EA optical modulator 12 and bias level of the light source 11. The optical transmitter 20 may include a ROM that stores the driving condition of the EA optical modulator 12 for each amount of optical frequency fluctuation. This kind of ROM is used for controlling the driving condition of the EA optical modulator 20 so as to optimize the amount of optical frequency fluctuation of the transmission light.

The optical frequency of the transmission light is monitored with a reference of the optical frequency in non-modulation mode. The polarization (Δf>0 or Δf<0) of the optical frequency fluctuation can be detected easily.

The optical frequency fluctuation monitor 24 is not limited to be installed in the optical transmitter 20. It is good enough that the optical frequency fluctuation monitor 24 is used when the driving condition of the EA optical modulator 12 is determined.

According to this embodiment, the driving condition of the optical modulator is controlled so that the amount of optical frequency fluctuation of the transmission light is optimized. Therefore, the optimum amount of optical frequency fluctuation can be provided without deterioration of power and waveform of the transmission light.

Further, the amount of optical frequency fluctuation is optimized dynamically in response to the bias voltage applied to the optical modulator. As a result, waveform deterioration of optical signals (transmission light) is sufficiently compensated.

Second Preferred Embodiment

Figure 13:
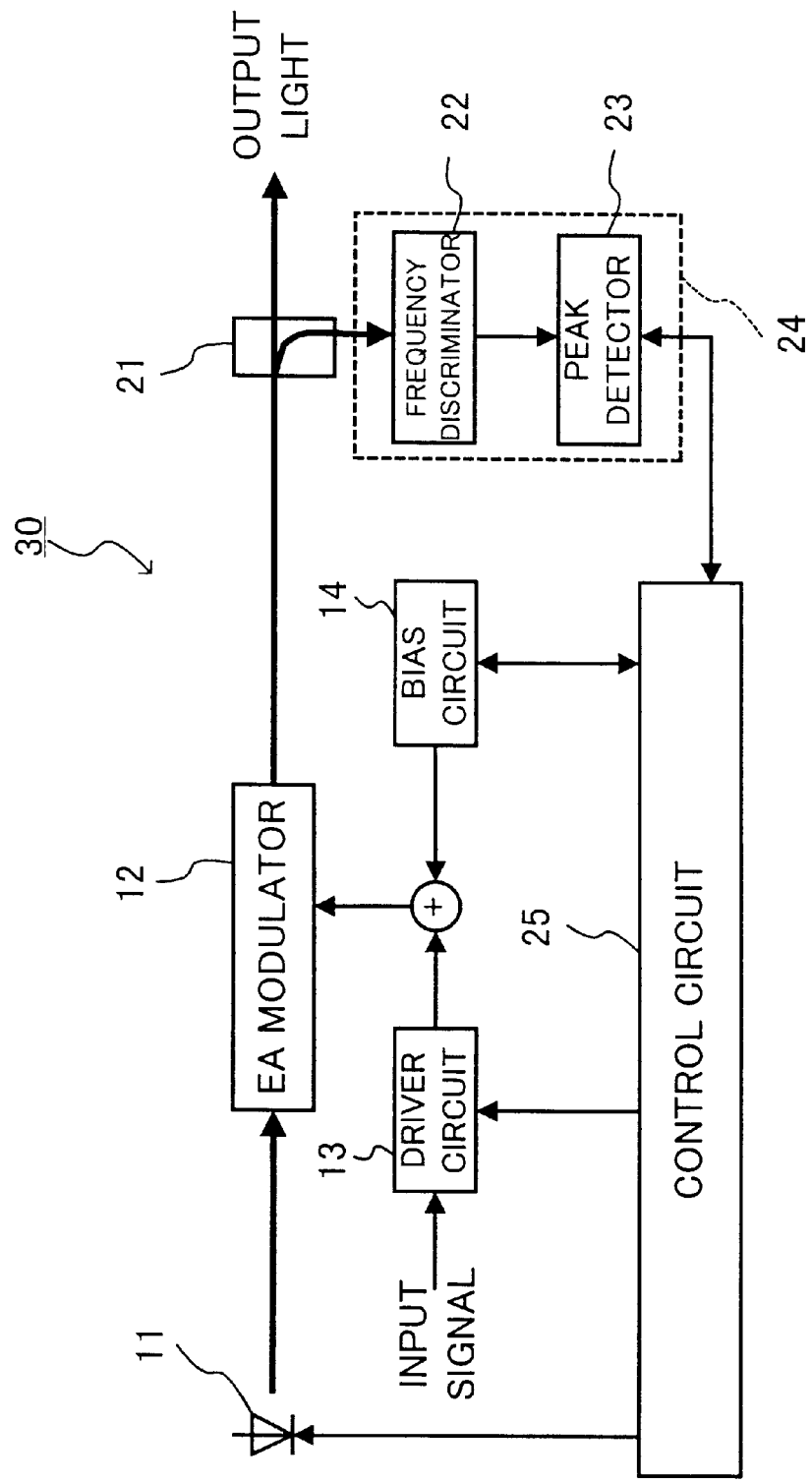
FIG. 13 is a block diagram showing an optical transmitter according to a second preferred embodiment of the present invention.

FIG. 13 shows an optical transmitter 30 according to a second preferred embodiment of the present invention, in which chirp parameter α can be controlled properly. In this embodiment, the same or corresponding components to those in the above described optical transmitter, shown in FIG. 11 are represented by the same reference numerals.

The optical transmitter 30 includes a light source 11, which may be a semiconductor laser; an EA optical modulator 12; a driver circuit 13; a bias circuit 14; an optical coupler 21; an optical frequency fluctuation monitor 24 for monitoring fluctuation of optical frequency of output light; and a control circuit 25. The optical frequency fluctuation monitor 24 includes an optical frequency discriminator 22 and a peak detector 23. The peak detector 23 is connected at the output terminal to the control circuit 25.

The light source 11 emits light that is to be modulated by an information-bearing signal. The EA optical modulator 12 is of Mach-Zehnder type and is supplied with the light emitted by the light source 11. The driver circuit 13 amplifies an electric input signal (information-bearing signal) to produce a drive signal (modulation signal) to be supplied to the EA optical modulator 12. The EA optical modulator 12 is driven in response to the drive signal supplied from the driver circuit 13. The bias circuit 14 generates a bias voltage to be supplied to the EA optical modulator 12. The control circuit 25 is connected to the light source 11, driver circuit 13, the bias circuit 14 and the optical frequency fluctuation monitor 24 (peak detector 23), so as to control them properly.

The light source 11 is a semiconductor laser that emits a specific wavelength of optical signals, for example, DFB (Distributed Feedback Laser). The EA optical modulator 12 power-modulates the light emitted by the light source 11. The driver circuit 13 supplies electric signals having the opposite logical states to electrodes of the EA optical modulator 12. The bias circuit 14 controls bias voltage to be applied to the electrodes of the EA optical modulator 12.

The optical coupler 21 splits (divides) output light supplied from the EA optical modulator 12 in accordance with its wavelength/direction. One of the divided lights is coupled to an optical fiber as a transmission signal, while the other divided light is supplied to the optical frequency discriminator 22.

The optical frequency discriminator 22 is, for example, an interferometer of Mach-Zehnder type, which has the discrimination characteristics shown in FIG. 12. As shown in FIG. 12, output voltage of the optical frequency discriminator 22 changes in level responding to the optical frequency of the transmission light.

In response to the peaks of output signal of the optical frequency discriminator 22, the peak detector 23 detects the peaks of frequency fluctuation of the transmission light signal.

As mentioned above, according to this embodiment, the optical signal supplied from the EA optical modulator 12 is split and one is supplied to the optical frequency discriminator 22. The optical frequency discriminator 22 detects optical frequency fluctuation of the transmission light, and then the peak detector 23 detects the peak value of the frequency fluctuation of the transmission light.

In response to the output signal supplied from the optical frequency fluctuation monitor 24, the control circuit 25 controls the amplitude of modulating waveform (drive signal) to be supplied to each of the electrodes of the EA optical modulator 12. In order to optimize the amount of optical frequency fluctuation of the transmission light, at least one of bias voltage supplied from the bias circuit 24, output waveform and duty of the driver circuit 13 is controlled.

In operation, light emitted by the light source 11 is supplied to the EA optical modulator 12 and is power-modulated. The EA optical modulator 12 modulates the light (optical carrier) by the electric signal (information-bearing signal), which has been amplified by the driver circuit 13.

The optical frequency fluctuation monitor 24 detects the peaks of optical frequency fluctuation in the transmission light, and supplies them to the control circuit 25.

The control circuit 25 controls the EA optical modulator 12 through the driver circuit 13 so that the peaks of optical frequency fluctuation of the transmission light (output light) keeps a certain value.

In the same manner as the first preferred embodiment, the amplitude and duty of the drive signal supplied from the EA optical modulator 12 are controlled for each bias voltage applied to the EA optical modulator 12. Driving condition of the EA optical modulator is provided for each value of optical frequency fluctuation of the transmission light. Such driving condition includes the bias voltage of the EA optical modulator 12. If the driving condition of the EA optical modulator 12 has been known, data for driving condition can be stored in a storage medium, such as a ROM. When the driving condition of the EA optical modulator 12 are stored in a ROM, the EA optical modulator 12 can be controlled automatically.

According to the optical transmitter 30 of the second preferred embodiment, the control circuit 25 keeps the peak value of optical frequency fluctuation being a fixed value in response to the signals supplied from the optical frequency fluctuation monitor 24. As a result, the amount of optical frequency fluctuation of the transmission light can be optimized without controlling driving condition of the EA optical modulator 12, such as the bias voltage applied thereto. Therefore, the optimum amount of optical frequency fluctuation can be provided without deterioration of light power and waveform.

Further, the amount of optical frequency fluctuation is optimized dynamically in response to the bias voltage applied to the optical modulator. As a result, waveform deterioration of optical signals (transmission light) is sufficiently compensated.

Third Preferred Embodiment

Figure 14:
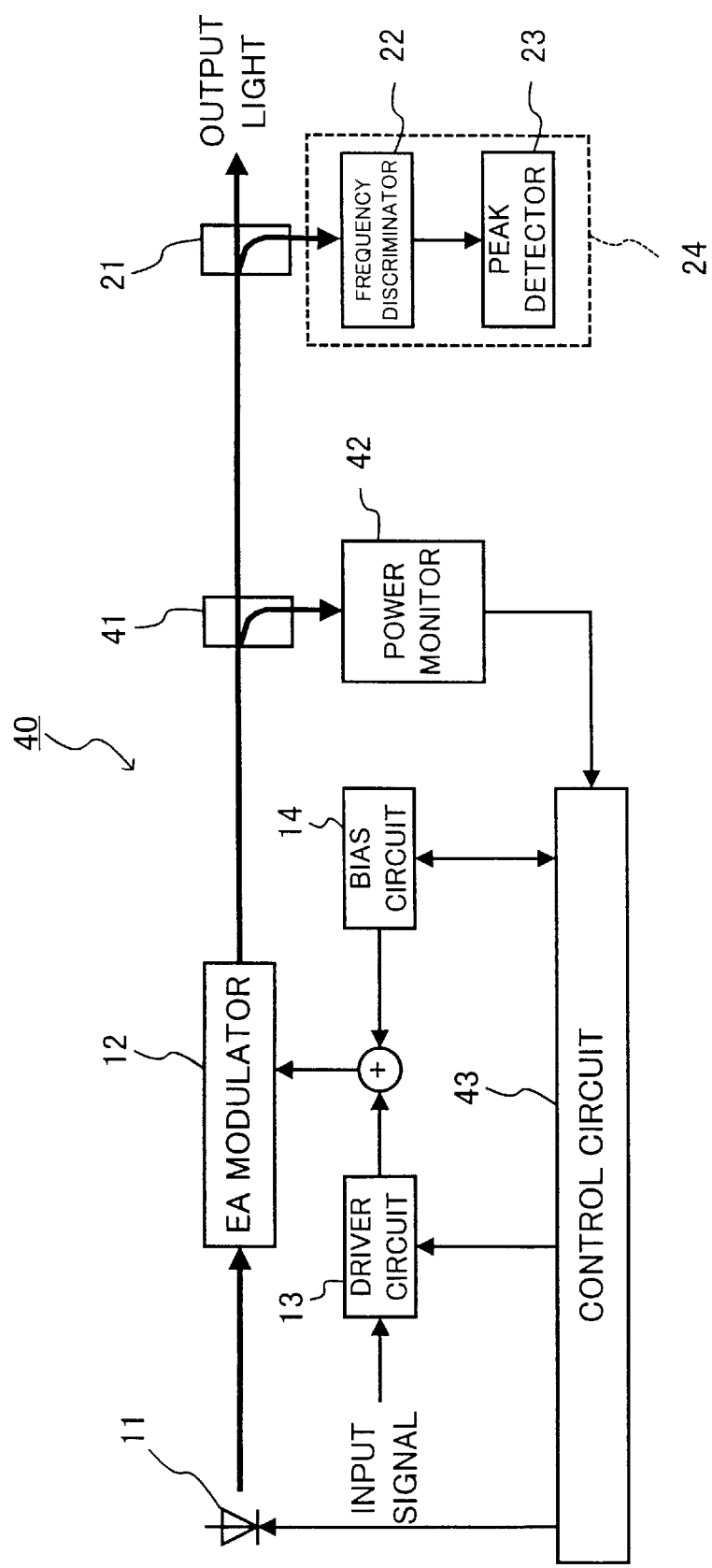
FIG. 14 is a block diagram showing an optical transmitter according to a third preferred embodiment of the present invention.

FIG. 14 shows an optical transmitter 40 according to a third preferred embodiment of the present invention, in which chirp parameter α can be controlled properly. In this embodiment, the same or corresponding components to those in the above described optical transmitters, shown in FIGS. 11 and 13 are represented by the same reference numerals.

The optical transmitter 40 includes a light source 11, which may be a semiconductor laser; an EA optical modulator 12; a driver circuit 13; a bias circuit 14; optical couplers 21 and 41; an optical frequency fluctuation monitor 24 for monitoring fluctuation of optical frequency of output light; a power monitor 42; and a control circuit 43.

The optical frequency fluctuation monitor 24 includes an optical frequency discriminator 22 and a peak detector 23. The optical coupler 41 splits (divides) output light supplied from the EA optical modulator 12 into two signals. The power monitor 42 monitors the power of an output light signal supplied from the EA optical modulator 12. The power monitor 42 is connected at an output terminal to the control circuit 43.

The control circuit 43 controls the amplitude of modulating waveform to be supplied to each of the electrodes of the EA optical modulator 12 independently in response to the output signals supplied from the optical frequency fluctuation monitor 24 and the power monitor 42.

In operation, light emitted by the light source 11 is supplied to the EA optical modulator 12 and is power-modulated. The EA optical modulator 12 modulates the light (optical carrier) by the electric signal (information-bearing signal), which has been amplified by the driver circuit 13.

The power monitor 42 detects the average value of light power of the transmission light (output light signal). The average value is supplied to the control circuit 43.

In the same manner as the second preferred embodiment, the optical frequency fluctuation monitor 24 detects peak value of optical frequency fluctuation of the transmission light. The control circuit 43 controls the EA optical modulator 12 through the driver circuit 13 so that the peaks of optical frequency fluctuation of the transmission light (output light) keeps a certain value (fixed value).

According to the third preferred embodiment, the optical transmitter 40 includes the optical coupler 41 and power monitor 42 so that the control circuit 43 operates in response to the power of the transmission light in addition to the output of the optical frequency fluctuation monitor 24. Thus, the optical frequency fluctuation can be optimized without deterioration of light power of the transmission light (output light signal). As a result, waveform deterioration of the transmission light is sufficiently compensated.

Fourth Preferred Embodiment

Figure 15:
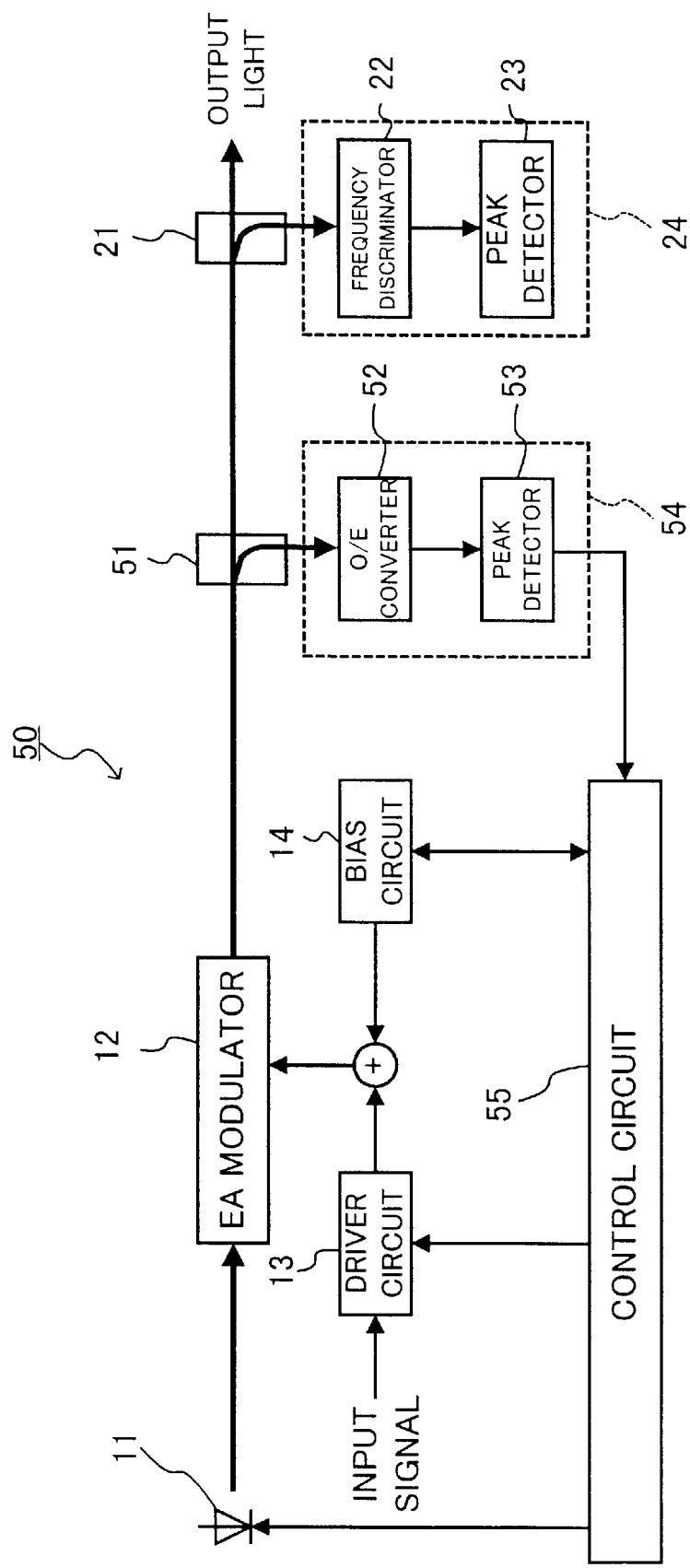
FIG. 15 is a block diagram showing an optical transmitter according to a fourth preferred embodiment of the present invention.

FIG. 15 shows an optical transmitter 50 according to a fourth preferred embodiment of the present invention. In this embodiment, the same or corresponding components to those in the above described optical transmitters, shown in FIGS. 11, 13 and 14 are represented by the same reference numerals.

The optical transmitter 50 includes a light source 11, which may be a semiconductor laser; an EA optical modulator 12; a driver circuit 13; a bias circuit 14; optical couplers 21 and 51; an optical frequency fluctuation monitor 24 for monitoring fluctuation of optical frequency of output light; an extinction ratio detector 54; and a control circuit 55.

The optical frequency fluctuation monitor 24 includes an optical frequency discriminator 22 and a peak detector 23. The optical coupler 51 splits (divides) output light supplied from the EA optical modulator 12 into two signals.

The extinction ratio detector 54 includes an O/E converter 52 and a peak detector 53. The O/E converter 52 is connected at an input terminal to the optical coupler 51 and at an output terminal to the peak detector 53. The peak detector 53 is connected at an output terminal to the control circuit 55. The peak detector 53 detects peak values from an output signal of the O/E converter 52. The peak detector 53 can be structured in the same manner as the peak detector 23 in the optical frequency fluctuation monitor 24.

The extinction ratio detector 54 detects the high and low levels of the transmission light to obtain the extinction ratio. The output of the extinction ratio detector 54 is supplied to the control circuit 55.

In response to the output signals supplied from the optical frequency fluctuation monitor 24 and the extinction ratio detector 54, the control circuit 55 controls the amplitudes of drive signals to be supplied to the electrodes of the EA optical modulator 12 independently.

In operation, light emitted by the light source 11 is supplied to the EA optical modulator 12 and is power-modulated. The EA optical modulator 12 modulates the light (optical carrier) by the electric signal (information-bearing signal), which has been amplified by the driver circuit 13. The optical coupler 51 splits the modulated signal (transmission light). One of the split signals is supplied to the extinction ratio detector 54, in which the optical signal is converted into an electric signal by the O/E converter 52. The peak detector 53 detects the peaks (high and low levels) of the transmission light signal (optical output waveform).

In general, the extinction ratio of an optical signal is obtained by the following formula (2):

$$\text{Extinction Ratio} = 10 \log_{10} (\text{High Level/Low Level}) \quad (2)$$

The control circuit 55 calculates the extinction ratio of the transmission light (output optical signal) in accordance with the formula (2). The control circuit 55 controls bias voltage and driving amplitude of the EA optical modulator 12 through the driver circuit 13 so as that the extinction ratio keeps larger than a predetermined value.

In the same manner as the second and third preferred embodiments, the optical frequency fluctuation monitor 24 detects peak value of optical frequency fluctuation of the transmission light. The control circuit 55 controls the EA optical modulator 12 through the driver circuit 13 so that the peaks of optical frequency fluctuation of the transmission light (output light) keeps a certain value (fixed value).

According to the fourth preferred embodiment, the optical transmitter 50 includes the extinction ratio detector 54, so that the amount of optical frequency fluctuation of the transmission light can be optimized without deterioration of extinction ratio of the transmission light (output light signal). As a result, waveform deterioration of the transmission light is sufficiently compensated.

Fifth Preferred Embodiment

Figure 16:
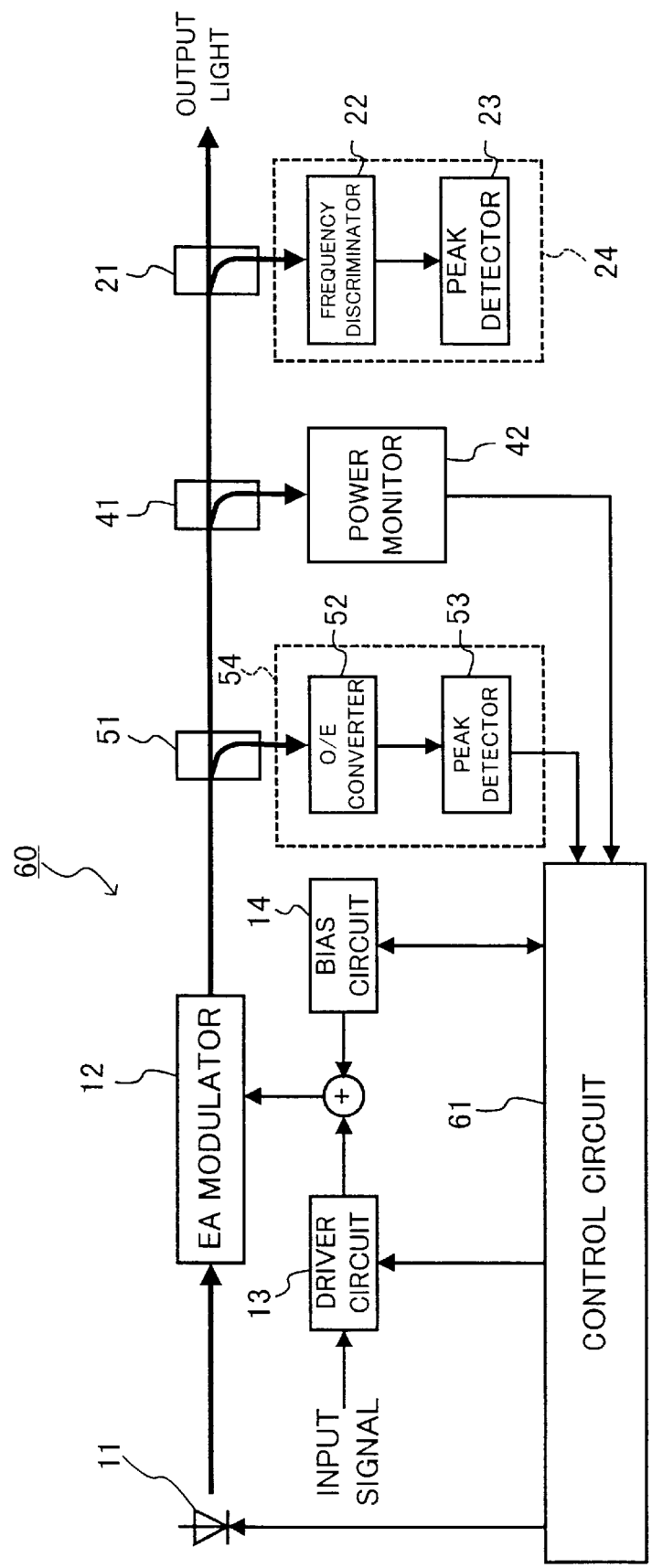
FIG. 16 is a block diagram showing an optical transmitter according to a fifth preferred embodiment of the present invention.

FIG. 16 shows an optical transmitter 60 according to a fifth preferred embodiment of the present invention. In this embodiment, the same or corresponding components to those in the above described optical transmitters, shown in FIGS. 11, 13, 14 and 15 are represented by the same reference numerals.

The optical transmitter 60 includes a light source 11, which may be a semiconductor laser; an EA optical modulator 12; a driver circuit 13; a bias circuit 14; optical couplers 21, 41 and 51; an optical frequency fluctuation monitor 24 for monitoring fluctuation of optical frequency of output light; a power monitor 42; an extinction ratio detector 54; and a control circuit 61.

The optical frequency fluctuation monitor 24 includes an optical frequency discriminator 22 and a peak detector 23. The optical coupler 51 splits (divides) output light supplied from the EA optical modulator 12 into two signals.

The power monitor 42 monitors the power of an output light signal supplied from the EA optical modulator 12. The power monitor 42 is connected at an output terminal to the control circuit 61. The power monitor 42 detects the average value of light power of the transmission light (output light signal). The average value is supplied to the control circuit 61.

The extinction ratio detector 54 includes an O/E converter 52 and a peak detector 53. The O/E converter 52 is connected at an input terminal to the optical coupler 51 and at an output terminal to the peak detector 53. The peak detector 53 is connected at an output terminal to the control circuit 61. The peak detector 53 detects peak values from an output signal of the O/E converter 52.

The extinction ratio detector 54 detects the high and low levels of the transmission light to obtain the extinction ratio.

The output of the extinction ratio detector 54 is supplied to the control circuit 61.

The control circuit 61 controls the amplitudes of modulating signals to be supplied to the electrodes of the EA optical modulator 12 independently in response to the output signals supplied from the optical frequency fluctuation monitor 24, the power monitor 42 and the extinction ratio detector 54.

In operation, light emitted by the light source 11 is supplied to the EA optical modulator 12 and is power-modulated. The EA optical modulator 12 modulates the light (optical carrier) by the electric signal (information-bearing signal), which has been amplified by the driver circuit 13.

The transmission signal divided at the optical coupler 51 is supplied to the extinction ratio detector 54, in which the optical signal is converted into an electric signal by the O/E converter 52. The peak detector 53 detects the peaks (high and low levels) of the transmission light signal (optical output waveform).

The control circuit 61 calculates the extinction ratio of the transmission light (output optical signal) in accordance with the output of the peak detector 53. The control circuit 61 controls bias voltage and driving amplitude of the EA optical modulator 12 through the driver circuit 13 so as that the extinction ratio keeps larger than a predetermined value. The control circuit 61 also controls bias voltage applied to the light source 11 so as to stabilize the average of optical power of the transmission light.

When the duty of the transmission light is 100%, the average of the high level and low level of the transmission light becomes the same as the average of the transmission light. In other words, the ratio between the average of the transmission light and the average of the high level and low level of the transmission light becomes the same as the duty. The control circuit 61 calculates the ratio of the average of the transmission light relative to the average of the high level and low level of the transmission light. The control circuit 61 controls the bias voltage applied to the EA optical modulator 12 so that the calculated ratio is maintained to be fixed.

According to the fifth preferred embodiment, the optical frequency fluctuation can be optimized without deterioration of extinction ratio and duty of the transmission light (output light signal). As a result, waveform deterioration of the transmission light is sufficiently compensated.

Sixth Preferred Embodiment

Figure 17:
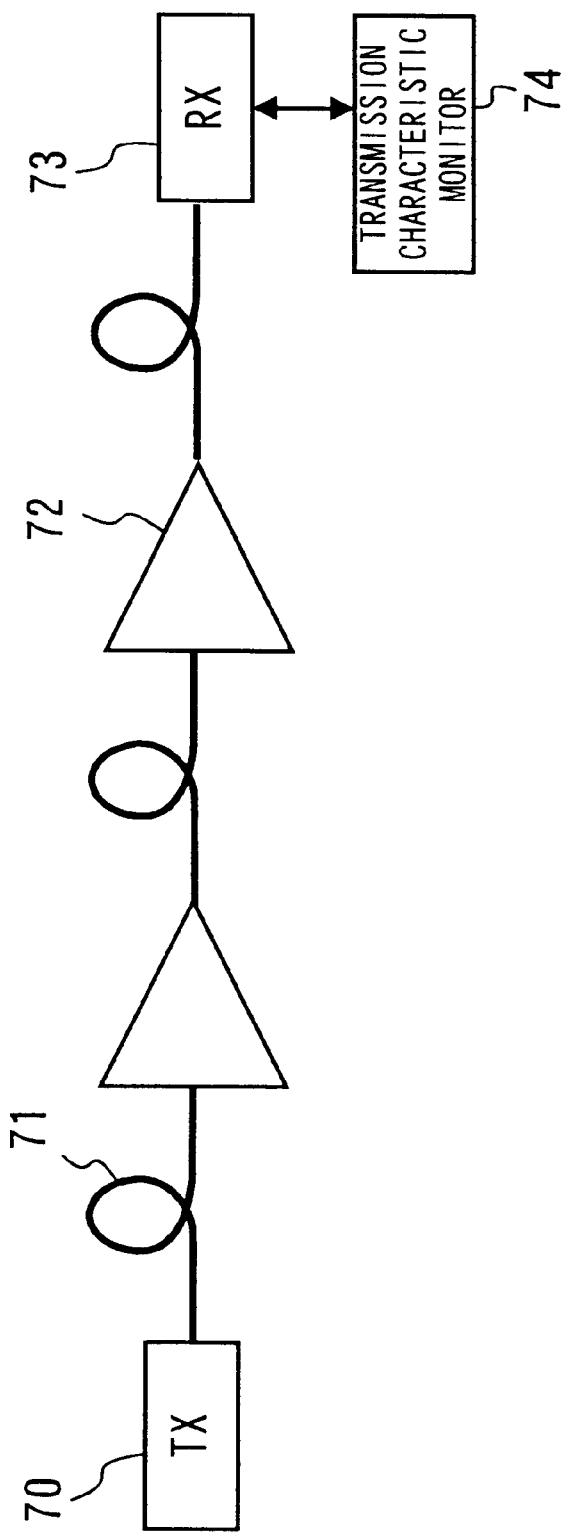
FIG. 17 is a block diagram showing an optical transmission system according to a sixth preferred embodiment of the present invention.

FIG. 17 shows an optical transmission system using an optical transmission simulator according to a sixth preferred embodiment of the present invention. The system use EDFAs (Erbium-Doped Fiber Amplifiers) 72 as optical fiber amplifiers.

The optical transmission system includes an optical transmitter (TX) 70, optical fibers 71, optical repeaters 72, an optical receiver 73 and a transmission characteristic monitor 74. The optical transmitter 70 is one selected from the above described optical transmitters 20, 30, 40, 50 and 60. Each of the optical repeaters 72 includes a light amplifier, which amplifies an optical signal. The transmission characteristic monitor 74 monitors the characteristics of the optical signal transmitted from the optical transmitter 70 to the optical receiver 73.

The optical transmitter (TX) 70 converts an electric signal into an optical signal having a specific wavelength. The system has double-line structure, one line of which (0 system) is usually used and the other line of which (1 system) is used when the 0 system has some troubles.

The optical repeater 72 includes a light amplifier which amplifies an optical signal in analog fashion.

Now, the operation of the above described optical transmission system is explained.

An optical signal generated in the optical transmitter 70, for example the optical transmitter 20 of the first preferred embodiment, is transmitted through the optical fibers 71 and the optical repeaters 72 to the optical receiver 73. The optical receiver 73 demodulates the transmission light to reproduce the original electric signal. The optical receiver 73 detects the Q factor and bit-error rate of the received waveform and performs a parity check. These data are supplied to the transmission characteristic monitor 74.

As described in the part of conventional technology, the waveform of an optical signal transmitted through an optical fiber varies depending on the dispersion characteristic of the optical fiber. As shown in FIG. 17, when the optical signal is amplified by the light amplifier, the waveform varies also depending on non-linear effect of the optical fibers. The characteristics of the transmitted light that includes Q factor and bit-error rate of the waveform are monitored by the transmission characteristic monitor 74. In the optical transmitter 70, the amount of optical frequency fluctuation is controlled so as to optimize the transmission characteristics. In other words, Q factor and BER (Bit-Error Rate) are optimized to have the maximum value and minimum value, respectively.

According to the sixth embodiment, the optical transmission system includes a first station using the optical transmitter 70 (for example the transmitter 20 of the first preferred embodiment) and a second station that is the optical receiver 73 and that is connected to the transmission characteristic monitor 74. Therefore, the transmission characteristics can be optimized. This kind of advantage can be obtained even if the transmission system includes no optical repeaters.

Seventh Preferred Embodiment

Figure 18:
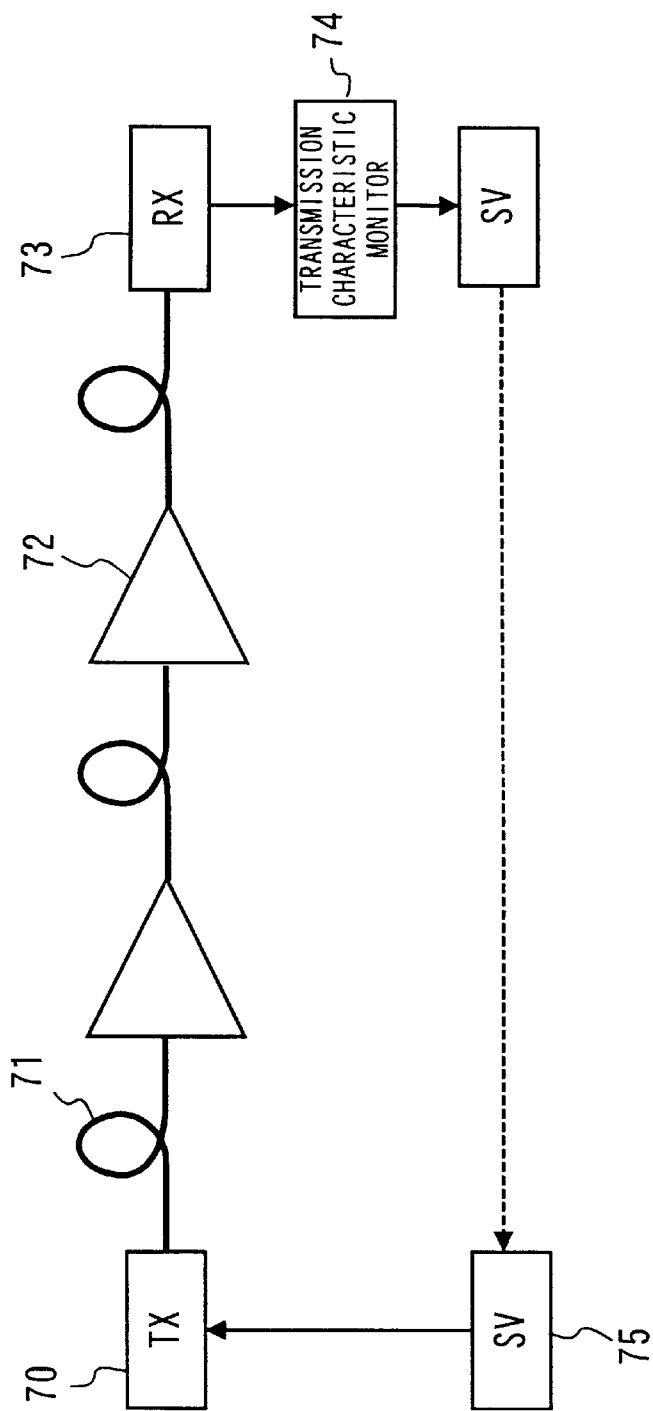
FIG. 18 is a block diagram showing an optical transmission system according to a seventh preferred embodiment of the present invention.

FIG. 18 shows an optical transmission system according to a seventh preferred embodiment of the present invention. In this embodiment, the same or corresponding components to those in the above described optical transmission system, shown in FIG. 17 are represented by the same reference numerals.

The optical transmission system includes an optical transmitter (TX) 70, optical fibers 71, optical repeaters 72, an optical receiver 73, a transmission characteristic monitor 74 and supervisory units 75. The optical transmitter 70 is one selected from the above described optical transmitters 20, 30, 40, 50 and 60. Each of the optical repeaters 72 includes a light amplifier, which amplifies an optical signal. The transmission characteristic monitor 74 monitors the characteristics of the optical signal transmitted from the optical transmitter 70 to the optical receiver 73.

The optical transmitter (TX) 70 converts an electric signal into an optical signal having a specific wavelength. The system has double-line structure one line of which (0 system) is usually used and the other line of which (1 system) is used when the 0 system has some troubles.

The optical repeater 72 includes a light amplifier which amplifies an optical signal in analog fashion. The supervisory units 75 monitors and controls whole the system in accordance with output signals from the transmission characteristic monitor 74.

Each supervisory unit 75 performs control of input/output devices, interruption processing, detection and control of parameters. The system is designed in a particular manner so that the supervisory units 75 can communicate to the other supervisory units 75 using a predetermined transmission line, such as a monitor network. The communication among the supervisory units 75, shown by a broken line in FIG. 18, can be realized by wavelength multiplexing on the optical fibers 71. The communication among the supervisory units 75 can also be realized using a monitor network with other optical fibers, or telephone lines, and the like.

Now, the operation of the above described optical transmission system is explained.

An optical signal supplied from the optical transmitter 70, for example the optical transmitter 20 of the first preferred embodiment, is transmitted through the optical fibers 71 and the optical repeaters 72 to the optical receiver 73. The optical receiver 73 demodulates the transmission light to reproduce the original electric signal (original information). The optical receiver 73 detects the Q factor, and bit-error rate of the received waveform and performs a parity check. These data are supplied to the transmission characteristic monitor 74.

The characteristics of the transmitted light that includes Q factor and bit-error rate of the waveform are monitored by the transmission characteristic monitor 74. In the optical transmitter 70, the amount of optical frequency fluctuation is automatically controlled so as to optimize the transmission characteristics. In other words, Q factor and BER (Bit-Error Rate) are optimized to have the maximum value and minimum value, respectively.

According to the seventh preferred embodiment, shown in FIG. 18, the optical transmission system includes supervisory units 75, which monitor and control whole the system based on the signals from the transmission characteristic monitor 74, so that the transmission characteristics can be optimized without controlling the optical transmitter 70. This kind of advantage can be obtained even if the transmission system includes no optical repeaters.

Eighth Preferred Embodiment

An optical transmission system according to an eighth preferred embodiment of the present invention includes the same components as the above-described seventh preferred embodiment, shown in FIG. 18.

In the eighth preferred embodiment, the optical transmitter 70 (for example, the optical transmitter 20 according to the first preferred embodiment) controls the amount of optical frequency fluctuation for each wavelength dispersion value of the optical fibers. When the transmission distance is short, one bias voltage to be applied to the EA optical modulator 12 is selected by a switch circuit in order to define the amount of optical frequency fluctuation.

As can be understood from FIGS. 1 and 2, it is possible to use different types of optical fibers (G.652 and G.653) for 100 km optical transmission by switching (selecting) predetermined chirp parameters or optical frequency fluctuation values. Thus, the amount of optical frequency fluctuation can be optimized in accordance with a given dispersion value of the optical fibers. When the transmission distance is extended more than 100 km using many optical repeaters, dispersion-compensating optical fibers are built in the optical repeaters.

As described above, according to the eighth preferred embodiment, the amount of optical frequency fluctuation can be optimized for each dispersion value of the optical fibers (transmission line). As a result, waveform deterioration of the transmission light is sufficiently compensated.

Ninth Preferred Embodiment

Figure 19:
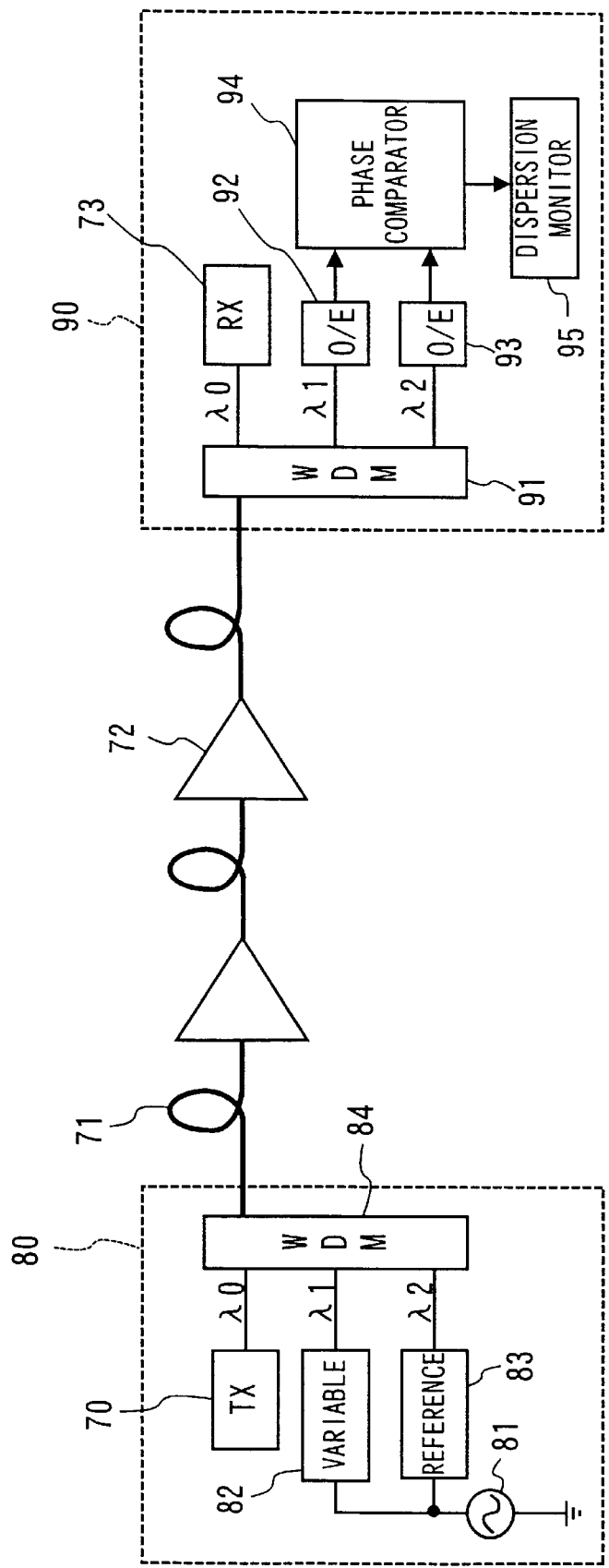
FIG. 19 is a block diagram showing an optical transmission system according to a ninth preferred embodiment of the present invention.

FIG. 19 shows an optical transmission system according to a ninth preferred embodiment of the present invention. In this embodiment, the same or corresponding components to those in the above described optical transmission systems, shown in FIGS. 17 and 18 are represented by the same reference numerals.

According to the ninth preferred embodiment, the amount of wavelength dispersion of a transmission line is monitored and controlled. The optical transmission system includes an optical transmitter unit 80, optical fibers 71, optical repeaters 72 and an optical receiver unit 90. The optical transmitter unit 80 includes an optical transmitter (TX) 70, an oscillator 81, a wavelength-variable light source 82, a reference light source 83 and a WDM (Wavelength Division Multiplexer) 84.

The optical transmitter 70 supplies light having a wavelength $\lambda 0$. The oscillator 81 is connected to input terminals of the wavelength-variable light source 82 and reference light source 83. The wavelength-variable light source 82 is connected at an output terminal to the WDM 84. The wavelength-variable light source 82 emits light having a wavelength $\lambda 1$ in response to the output of the oscillator 81. The reference light source 83 is connected at an output terminal to the WDM 84. The reference light source 83 emits light having a wavelength $\lambda 2$ in response to the output of the oscillator 81. In accordance with the lights with wavelengths $\lambda 0$, $\lambda 1$ and $\lambda 2$, the WDM 84 perform wavelength division multiplexing to generate an optical signal to be transmitted toward the optical receiver unit 90.

The optical receiver unit 90 includes an optical receiver (RX) 73, a WDM 91, first and second receiving optics 92 and 93, a phase comparator 94 and a dispersion monitor 95. The WDM is connected at an input terminal to the optical fiber 71 and at output terminals to the optical receiver 73 and the receiving optics 92 and 93. The first and second receiving optics 92 and 93 are connected at output terminals to the phase comparator 94, of which the output terminal is connected to the dispersion monitor 95.

The WDM 91 splits a light signal, transmitted from the optical transmitter unit 80, into three optical signals having different wavelengths of $\lambda 0$, $\lambda 1$ and $\lambda 2$. The optical receiver 73 is supplied with the optical signal having the wavelength of $\lambda 0$. The first and second receiving optics 92 and 93 are supplied with the other optical signals having the wavelengths of $\lambda 1$ and $\lambda 2$, and converts them into electric signals, respectively. The phase comparator 94 compares the phases of the electric signals supplied from the first and second receiving optics 92 and 93. The dispersion monitor 95 monitors wavelength dispersion of the transmitted signal in accordance with the phase difference signal supplied from the phase comparator 94.

In the optical transmitter unit 80, the wavelength-variable light source 82 and the reference light source 83 are modulated by signals supplied from the oscillator 81. The three different optical signals, supplied from the optical transmitter 70, wavelength-variable light source 82 and reference light source 83, are wavelength-multiplexed by the WDM 84. The multiplexed signal is transmitted through the optical fibers 71 and the optical repeaters 72 to the optical transmitter unit 90.

In the optical receiver unit 90, the WDM 91 splits the transmitted optical signal into the signals having the wavelengths of $\lambda 0$, $\lambda 1$ and $\lambda 2$. Those optical signals of $\lambda 0$, $\lambda 1$ and $\lambda 2$ are supplied to the optical receiver 73 and the receiving optics 92 and 93, respectively. The output electric signals of the receiving optics 92 and 93 are supplied to the phase comparator 94 and compared thereat. The phase comparator 94 detects the phase difference between the two signals.

The phase difference of the $\lambda 1$ component from the $\lambda 2$ component is detected in the optical receiver unit 90 while the wavelength of the optical signal of $\lambda 1$ is changed by controlling the wavelength-variable light source 82 in the optical transmitter unit 80. If a plurality of transmission lines are provided, the WDMs 84 and 91 can be omitted.

In the phase comparator 94, the wavelength dependency of the phase difference is detected. The dispersion monitor 95 differentiates the data from the phase comparator 94 by the wavelength to calculate wavelength dispersion around the wavelength of $\lambda 0$.

Figure 20:
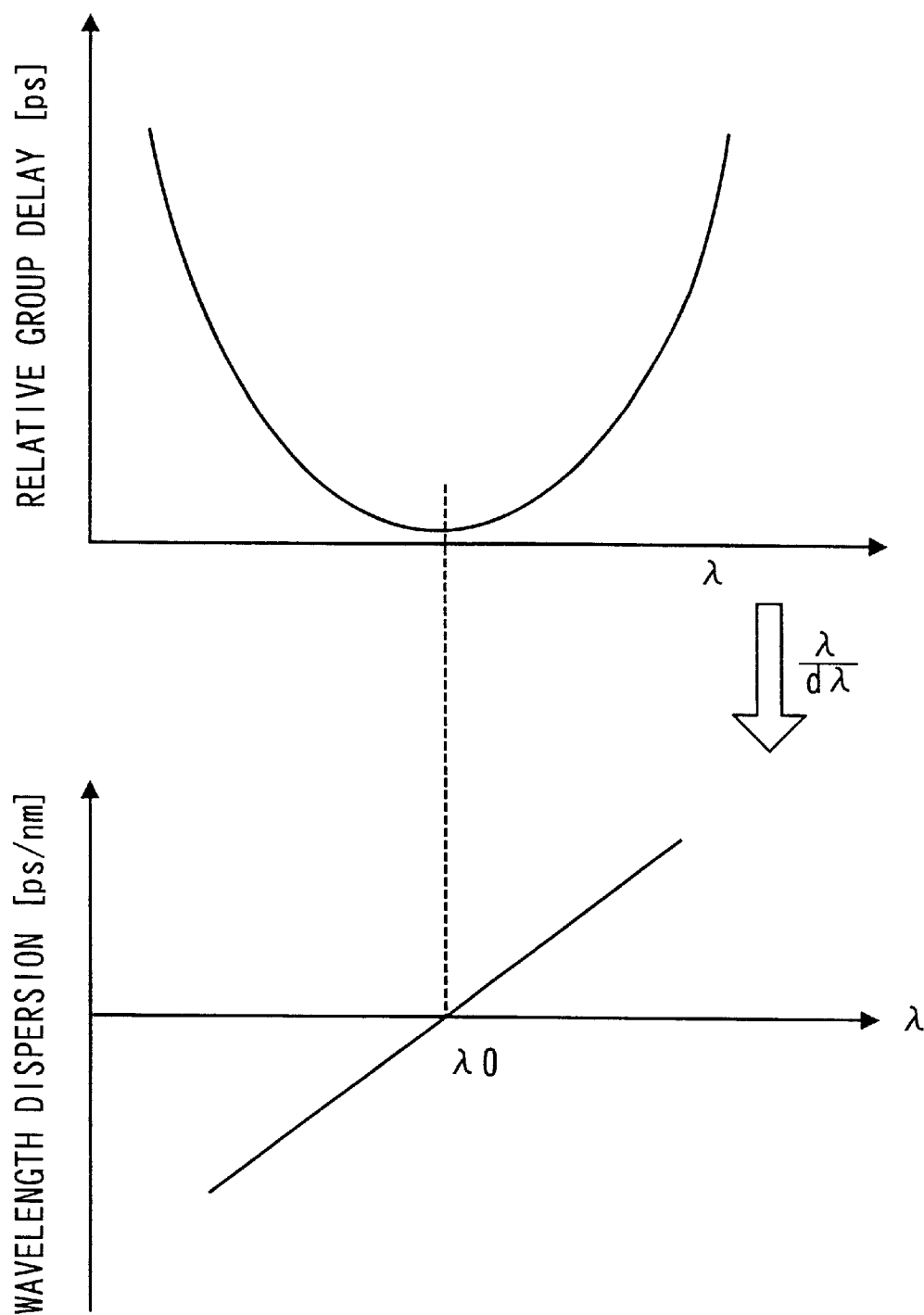
FIG. 20 are graphs used for explaining measurement theory of wavelength dispersion of optical fibers provided in the optical transmitter and the optical communication system, shown in FIG. 19.

FIG. 20 shows graphs used for explaining the calculating theory of wavelength dispersion of optical fibers. In the upper graph in FIG. 20, the horizontal axis represents the wavelength of transmission light while the vertical axis represents relative group delay. In the lower graph, the horizontal axis represents the wavelength of transmission light while the vertical axis represents wavelength dispersion.

In FIG. 20, the phase difference between the above described $\lambda 1$ component and $\lambda 2$ component of light corresponds to relative group delay of the optical fibers. In general, wavelength dispersion of optical fibers can be calculated by wavelength-differentiating the corresponding relative group delay. Thus, the phase difference is differentiated by the wavelength to calculate a dispersion value for each wavelength. Such a dispersion value can be obtained using a marketed device, such as 83467A produced by HP.

Tenth Preferred Embodiment

Figure 21:
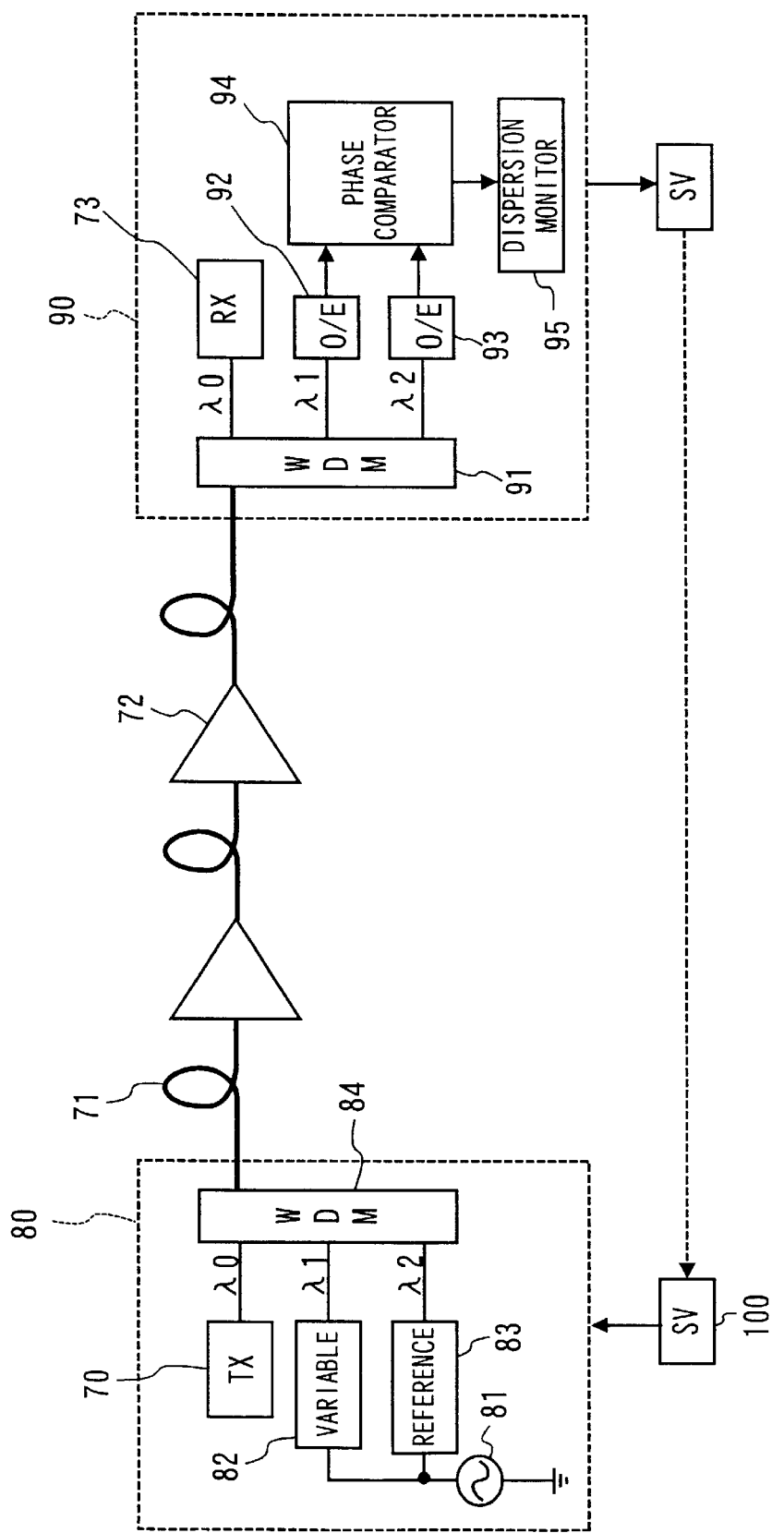
FIG. 21 is a block diagram showing an optical transmission system according to a tenth preferred embodiment of the present invention.

FIG. 21 shows an optical transmission system according to a tenth preferred embodiment of the present invention. In this embodiment, the same or corresponding components to those in the above described optical transmission systems, shown in FIGS. 17, 18 and 19 are represented by the same reference numerals.

According to the tenth preferred embodiment, wavelength dispersion of a transmission line, used in the system shown in FIG. 19, is monitored. The optical transmission system includes an optical transmitter unit 80, optical fibers 71, optical repeaters 72, an optical receiver unit 90 and supervisory units 100.

The optical transmitter unit 80 includes an optical transmitter (TX) 70, an oscillator 81, a wavelength-variable light source 82, a reference light source 83 and a WDM (Wavelength Division Multiplexer) 84.

The optical transmitter 70 supplies light having a wavelength $\lambda 0$. The oscillator 81 is connected to input terminals of the wavelength-variable light source 82 and reference light source 83. The wavelength-variable light source 82 is connected at an output terminal to the WDM 84. The wavelength-variable light source 82 emits light having a wavelength $\lambda 1$ in response to the output of the oscillator 81. The reference light source 83 is connected at an output terminal to the WDM 84. The reference light source 83 emits light having wavelength $\lambda 2$ in response to the output of the oscillator 81. In accordance with the lights having wavelengths $\lambda 0$, $\lambda 1$ and $\lambda 2$, the WDM 84 performs wavelength division multiplexing to generate an optical signal to be transmitted toward the optical receiver unit 90.

The optical receiver unit 90 includes an optical receiver (RX) 73, a WDM 91, first and second receiving optics 92 and 93, a phase comparator 94 and a dispersion monitor 95. The WDM is connected at an input terminal to the optical fiber 71 and at output terminals to the optical receiver 73 and the receiving optics 92 and 93. The first and second receiving optics 92 and 93 are connected at output terminals to the phase comparator 94, of which the output terminal is connected to the dispersion monitor 95.

The WDM 91 splits the transmission signal, supplied from the optical transmitter unit 80, into three optical signals having different wavelengths of $\lambda 0$, $\lambda 1$ and $\lambda 2$. The optical receiver 73 is supplied with the optical signal having the wavelength of $\lambda 0$. The first and second receiving optics 92 and 93 are supplied with the other optical signals having the wavelengths of $\lambda 1$ and $\lambda 2$, and converts them into electric signals, respectively. The phase comparator 94 compares the phases of the electric signals supplied from the first and second receiving optics 92 and 93. The dispersion monitor 95 monitors wavelength dispersion of the transmitted signal in accordance with the phase difference signal supplied from the phase comparator 94.

The supervisory units 100 supervise the whole system in accordance with the output signal of the wavelength dispersion monitor 95. Each supervisory unit 100 performs control of input/output devices, interruption processing, and detection and control of parameters. The system is designed in a particular manner so that the supervisory units 100 can be communicate to the other supervisory units 100 using a predetermined transmission line, such as a monitor network. The communication among the supervisory units 100, shown by a broken line in FIG. 21, can be realized by wavelength multiplexing on the optical fibers 71. The communication among the supervisory units 100 can be also be realized using a monitor network with other optical fibers, or telephone lines, and the like.

In operation, the output signal of the dispersion monitor 95 is transferred via the supervisory units 100 to the optical transmitter 70. In other words, the amount of wavelength dispersion that is monitored by the optical receiver unit 90 is feedback to the optical transmitter 70 via the supervisory units 100. In the optical transmitter 70, a bias voltage applied to the EA optical modulator is automatically controlled based on the monitored value of dispersion so as to optimize optical frequency fluctuation (variation) of the transmission light. The driving condition of the EA optical modulator can be stored in a storage medium, such as a ROM, so that the EA optical modulator can be controlled automatically.

According to the above-described tenth preferred embodiment of the present invention, it is not required to grasp the wavelength dispersion of optical fibers, which have been laid. Thus, the optical frequency fluctuation (variation) of transmission light can be optimized automatically without regulating some devices in the optical transmitter. As a result, waveform deterioration of the transmission light is sufficiently compensated.

Eleventh Preferred Embodiment

Figure 22:
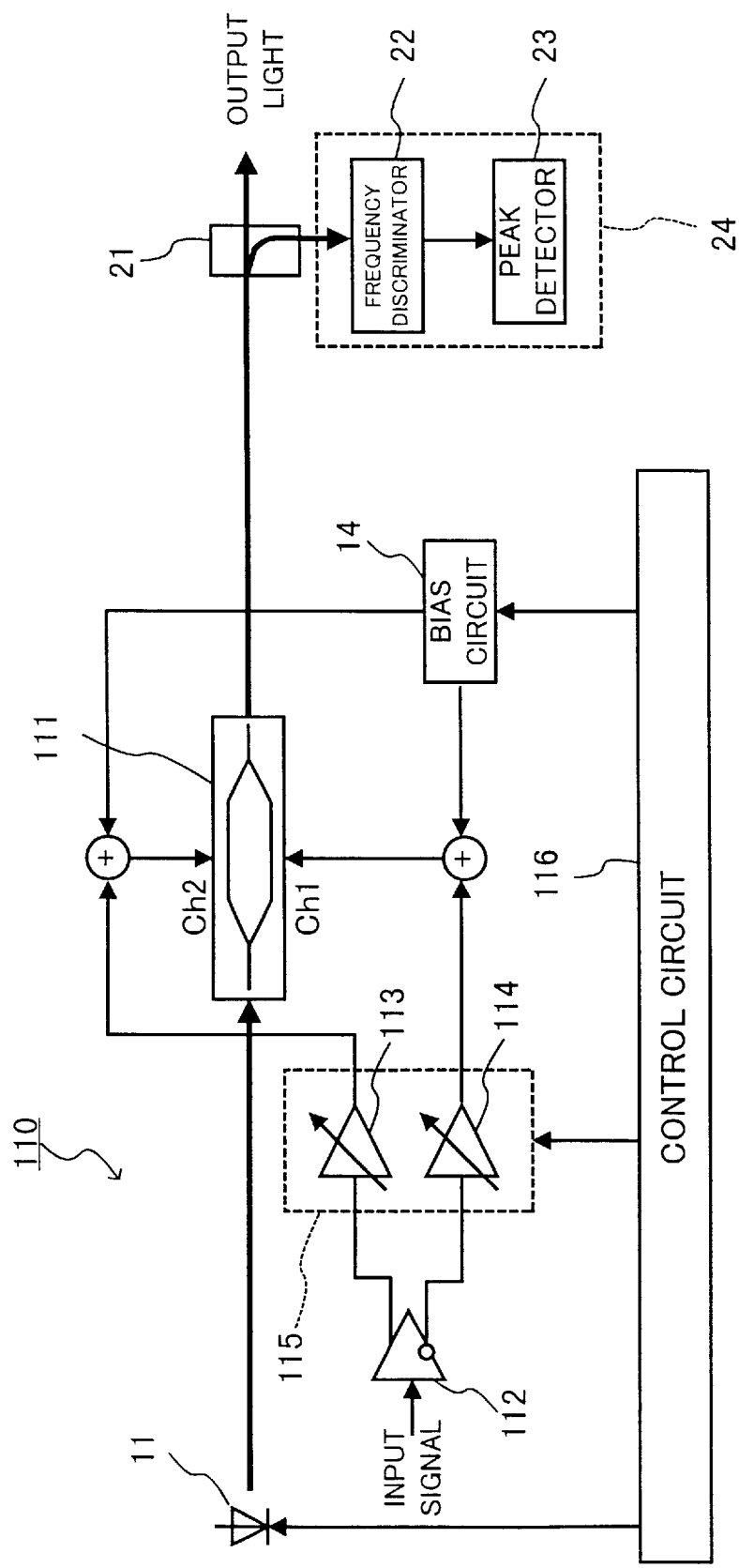
FIG. 22 is a block diagram showing an optical transmitter according to an eleventh preferred embodiment of the present invention.

FIG. 22 shows an optical transmitter 110 according to an eleventh preferred embodiment of the present invention. In this embodiment, the same or corresponding components to those in the above described optical transmission systems are represented by the same reference numerals.

The optical transmitter 110 shown in FIG. 22 is formed by adding function for controlling chirp parameter to one of the systems, shown in FIGS. 11 and 19. "Chirp parameter" is a coefficient indicating wavelength fluctuation of a light source.

The optical transmitter 110 includes a light source 11, which may be a semiconductor laser; a Mach-Zehnder optical modulator 111; an input buffer 112 (modulator driving circuit); an AGC (Automatic Gain Control) amplifier unit 115; a bias circuit 14; an optical coupler 21; an optical frequency fluctuation monitor 24 for monitoring fluctuation of optical frequency of output light; and a control circuit 116.

The AGC amplifier unit 115 includes a first AGC amplifier 113 (first bias circuit) and a second AGC amplifier 114 (second bias circuit). The optical frequency fluctuation monitor 24 includes an optical frequency discriminator 22 and a peak detector 23.

The light source 11 emits lights that is to be modulated by an information-bearing signal. The Mach-Zehnder optical modulator 111 is supplied with the light emitted by the light source 11. The input buffer 112 is a circuit used for driving the modulator 111. The input buffer 112 generates a pair of output signals, having the opposite logic of each other, in accordance with an input electric signal. The output signals of the input buffer 112, are supplied through the AGC amplifier unit 115 to electrodes of the Mach-Zehnder optical modulator 111.

In the AGC amplifier unit 115, the first AGC amplifier 113 amplifies a non-inverted signal supplied from the input buffer 112 and supplies the amplified signal to a modulation terminal (Ch2) of the Mach-Zehnder optical modulator 111. On the other hand, the second AGC amplifer 114 amplifiers the inverted signal supplied from the input buffer 112 and supplies the amplified signal to a modulation terminal (Ch1) of the Mach-Zehnder optical modulator 111.

The bias circuit 14 generates a bias voltage to be supplied to the Mach-Zehnder optical modulator 111. The light source 11 is a semiconductor laser that emits a specific wavelength of optical signals, for example, DFB (Distributed Feedback Laser). The Mach-Zehnder optical modulator 111 power-modulates the light emitted by the light source 11.

The control circuit 116 is connected to the light source 11, AGC amplifier unit 115 and the bias circuit 14, so as to control them properly. The control circuit 116 controls the amplitude of modulating waveform (drive signal) to be supplied to the Mach-Zehnder optical modulator 111 for each of the electrodes independently. In order to optimize the optical frequency fluctuation of the transmission light, for example, the control circuit 116 controls the output amplitudes of the first and second AGC amplifiers 113 and 114, or the bias voltages to be applied to the modulation terminals Ch1 and Ch2.

In operation, light emitted by the light source 11 is supplied to the Mach-Zehnder optical modulator 111 and is power-modulated. The modulated light is split by the optical coupler 21 into two signals, one of which is coupled to the optical fiber as transmission light and the other is supplied to the optical frequency discriminator 22 in the optical frequency fluctuation monitor 24.

The optical frequency discriminator 22 detects optical frequency fluctuation of the transmission light. The peak detector 23 detects the peak value of frequency fluctuation of the transmission light.

The input electric signal is divided by the input buffer 112 into non-inverted and inverted signals. The non-inverted signal is supplied to the first AGC amplifier 113 and the inverted signal is supplied to the second AGC amplifier 114. The outputs of the first and second AGC amplifiers 113 and 114 are supplied to the modulation terminals Ch2 and Ch1 of the Mach-Zehnder optical modulator 111, respectively. The modulation terminals Ch1 and Ch2 of the Mach-Zehnder optical modulator 111 are applied with bias voltages from the bias circuit 14.

The control circuit 116 controls both gain of the first and second AGC amplifiers 113 and 114 and the bias voltage supplied from the bias circuit 14.

The control circuit 116 controls, in response to the variation of the bias voltage, at least one of the output power of the light source 11, the amplitude of output waveform of the input buffer 112 and the duty.

In general, a Mach-Zehnder optical modulator splits an input light signal then phase-modulates the signals. Next, the signals are combined and interfered to each other to generate a transmission light signal, which has been power-modulated. Conventionally, one of the split signals is only modulated in phase. In this case, the chirp parameter is defined mainly by the type of modulation electrodes, so that only switching of polarization (positive or negative) can be allowed. When both the split signals are modulated, the chirp parameter can be changed continuously, as described in "High-speed, low power optical modulator with adjustable chirp parameter" by S. K. korotky et al., Integrated Photonics Research 1991, TuG2, pp53–54.

Chirp parameter $\alpha$ is calculated by the following formula (3):

$$\alpha = (1+r)/(1-r) \qquad (3)$$

where $r = \Delta\beta 2/\Delta\beta 1$, "$\Delta\beta 1$" represents the variation of phase velocity of light at Ch1 and "$\Delta\beta 2$" represents the variation of phase velocity of light at electrode terminal Ch2.

Figure 23:
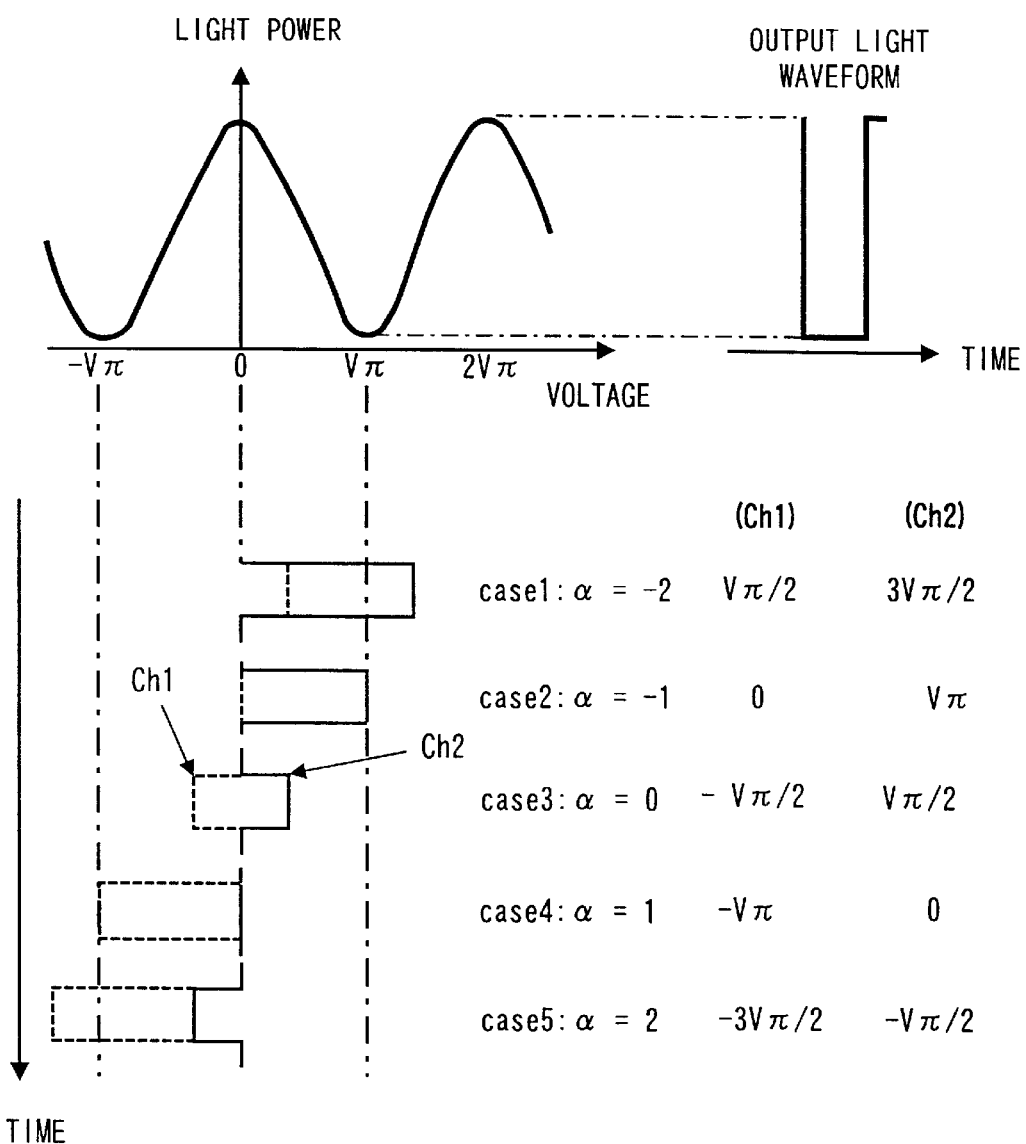
FIG. 23 is a graph used for explaining the operation of a Mach-Zehnder optical modulator (dual-electrode driving) provided in the optical transmitter, shown in FIG. 22.

If the phase velocity variation of light changes in proportion to the modulation voltage, the chirp parameter $\alpha$ can be controlled under the driving condition shown in FIG. 23.

FIG. 23 is used for explaining the operation of Mach-Zehnder optical modulators (dual electrode driving). In FIG. 23, "$V\pi$" represents a voltage that is required to change the phase of light by an amount of $\pi$.

When chirp parameter is "−1" ($\alpha = -1$, case 2), a voltage of 0V is applied to the electrode terminal Ch1 and no modulation is performed thereat. On the other hand a voltage $V\pi$ is applied to the electrode terminal Ch2 and modulation is performed with the amplitude of $V\pi$, in which 0V corresponds to the low level of the output light waveform.

When chirp parameter $\alpha$ is "+1" ($\alpha = 1$, case 4), 0V is applied to the electrode terminal Ch2 and no modulation is performed thereat. On the other hand, a voltage $V\pi$ is applied to the electrode terminal Ch1 and modulation is performed with the amplitude of $V\pi$, in which 0V corresponds to the high level of the output light waveform.

When chirp parameter is zero ($\alpha = 0$, case 3), modulation is performed at the electrode terminal Ch1 with the amplitude of $V\pi/2$, in which 0V corresponds to the high level. On the other hand, modulation is performed at the electrode terminal Ch2 with the amplitude of $V\pi/2$, in which 0V corresponds to the low level of the output light waveform.

Consequently, in a range of chirp parameter between −1 to +1, input light signals are modulated at the electrode terminals Ch1 and Ch2 with driving signals having the opposite logic, in which the sum of the amplitudes of the driving signals becomes $V\pi$.

When the absolute value of the chirp parameter is not more than one ($|\alpha| > 1$), case 1 and case 5, a selector is inserted between the input buffer 112 and the AGC amplifier unit 115 to change the logic of the input signals.

As described above, a chirp parameter is defined by the amount of optical frequency fluctuation of a transmission light, as shown in the formula (1). Thus, amplitudes of driving signals and bias voltages applied to the electrode terminals Ch1 and Ch2 of the modulator 111 are regulated in accordance with the optical frequency fluctuation, which is monitored, in order to compensate waveform deterioration of the transmission light.

According to the eleventh preferred embodiment, shown in FIG. 22, the optical frequency fluctuation of transmission light (output light signal) can be optimized even when the Mach-Zehnder optical modulator 111 is driven through a pair of electrode terminals. Therefore, waveform deterioration of the transmission light is sufficiently compensated.

Twelfth Preferred Embodiment

Figure 24:
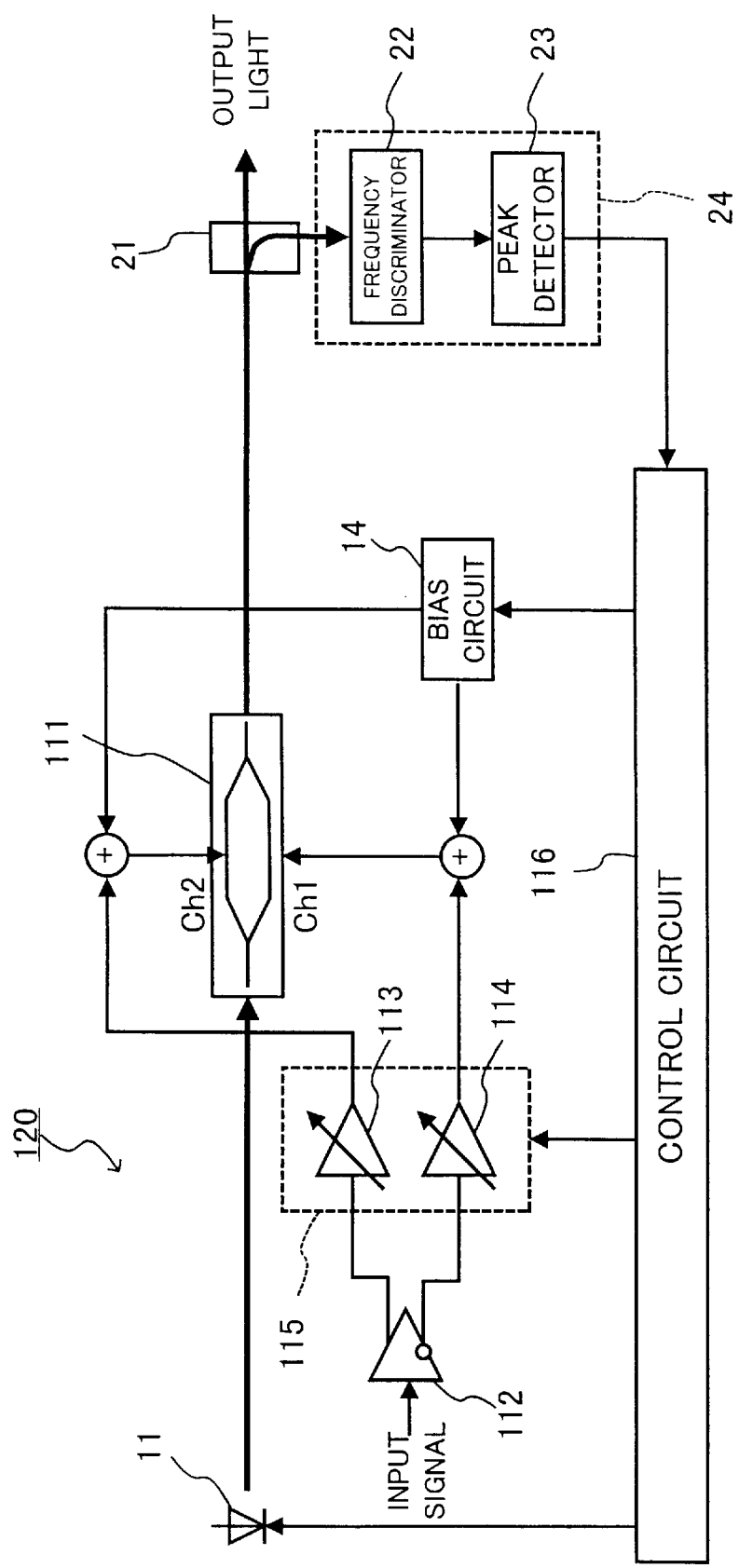
FIG. 24 is a block diagram showing an optical transmitter according to a twelfth preferred embodiment of the present invention.

FIG. 24 shows an optical transmitter 120 according to a twelfth preferred embodiment of the present invention. In this embodiment, the same or corresponding components to those in the above described optical transmitter, especially shown in FIG. 22, are represented by the same reference numerals.

An optical transmitter 120 of this embodiment shown in FIG. 24 includes a light source 11, which may be a semiconductor laser; a Mach-Zehnder optical modulator 111; an input buffer 112 (modulator driving circuit); an AGC (Automatic Gain Control) amplifier unit 115; a bias circuit 14; an optical coupler 21; an optical frequency fluctuation monitor 24 for monitoring fluctuation of optical frequency of output light; and a control circuit 116.

The AGC amplifier unit 115 includes a first AGC amplifier 113 (first bias circuit) and a second AGC amplifier 114 (second bias circuit). The optical frequency fluctuation monitor 24 includes an optical frequency discriminator 22 and a peak detector 23. The light source 11 emits light that is to be modulated by an information-bearing signal.

In the AGC amplifier unit 115, the first AGC amplifier 113 amplifies a non-inverted signal supplied from the input buffer 112 and supplies the amplified signal to a modulation terminal (Ch2) of the Mach-Zehnder optical modulator 111. On the other hand, the second AGC amplifier 114 amplifies the inverted signal supplied from the input buffer 112 and supplies the amplified signal to a modulation terminal (Ch1) of the Mach-Zehnder optical modulator 111.

The bias circuit 14 generates a bias voltage to be supplied to the Mach-Zehnder optical modulator 111.

The control circuit 116 is connected to the light source 11, AGC amplifier unit 115, the bias circuit 14 and the optical frequency fluctuation monitor 24, so as to control them properly. The control circuit 116 controls the amplitude of modulating waveform (drive signal) to be supplied to the Mach-Zehnder optical modulator 111 for each of the electrodes independently. In order to optimize the optical frequency fluctuation of the transmission light, for example, the control circuit 116 controls the output amplitudes of the first and second AGC amplifier 113 and 114, or the bias voltages to be applied to the modulation terminals Ch1 and Ch2.

In operation, light emitted by the light source 11 is supplied to the Mach-Zehnder optical modulator 111 and is power-modulated. The modulated light is split by the optical coupler 21 into two signals, one of which is coupled to the optical fiber as transmission light and the other is supplied to the optical frequency discriminator 22 in the optical frequency fluctuation monitor 24.

The optical frequency discriminator 22 detects optical frequency fluctuation of the transmission light. The peak detector 23 detects the peak value of frequency fluctuation of the transmission light signal (output light signal).

The input electric signal is divided by the input buffer 112 into non-inverted and inverted signals. The non-inverted signal is supplied to the first AGC amplifier 113 and the inverted signal is supplied to the second AGC amplifier 114. The outputs of the first and second AGC amplifiers 113 and 114 are supplied to the modulation terminals Ch2 and Ch1 of the Mach-Zehnder optical modulator 111, respectively. The modulation terminals Ch1 and Ch2 of the Mach-Zehnder optical modulator 111 are applied with bias voltages from the bias circuit 14.

The control circuit 116 controls the Mach-Zehnder optical modulator 111 through the AGC amplifier unit 115 so as to stabilize the peak value of optical frequency fluctuation of the output light signal (transmission light).

In this embodiment, driving amplitude and the duty of driving waveform (drive signal) of the Mach-Zehnder optical modulator 111 are controlled for each bias voltage. If the driving condition, such as a bias voltage of the Mach-Zehnder optical modulator 111, have been known, the driving condition of the Mach-Zehnder optical modulator 111 can be stored in a storage medium, such as a ROM. When the operating parameters of the Mach-Zehnder optical modulator 111 are stored in a ROM, the modulator 111 can be controlled automatically.

According to the twelfth preferred embodiment, shown in FIG. 24, the control circuit 116 operates in response to the output of the optical frequency fluctuation monitor 24, so that the optical frequency fluctuation of transmission light (output light signal) can be optimized without regulation. As a result, waveform deterioration of the transmission light is sufficiently compensated.

Thirteenth Preferred Embodiment

Figure 25:
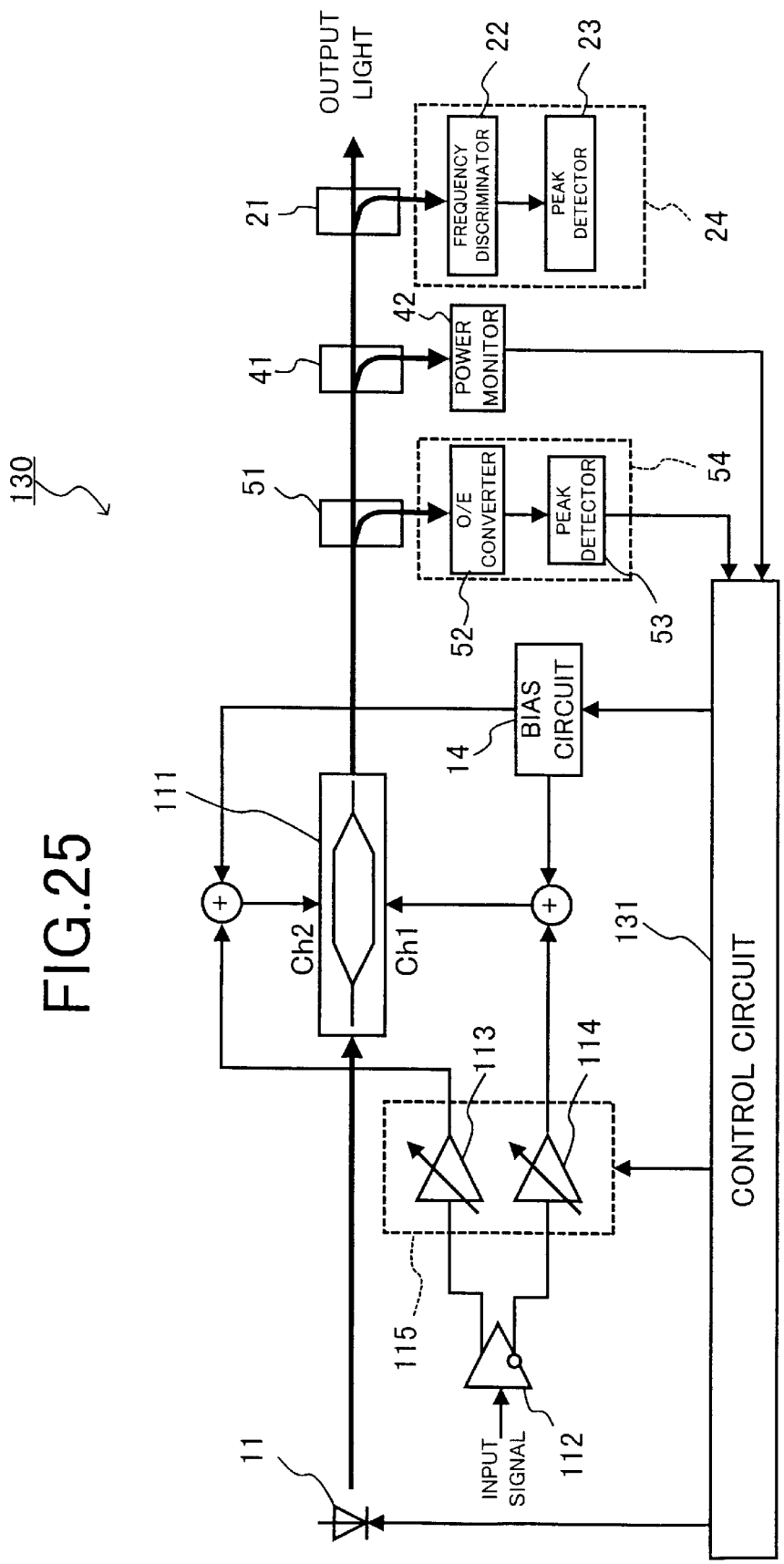
FIG. 25 is a block diagram showing an optical transmitter according to a thirteenth preferred embodiment of the present invention.

FIG. 25 shows an optical transmitter 130 according to a thirteenth preferred embodiment of the present invention. In this embodiment, the same or corresponding components to those in the above described optical transmitter, especially shown in FIGS. 16 and 22, are represented by the same reference numerals.

An optical transmitter 130 of this embodiment shown in FIG. 25 includes a light source 11, which may be a semiconductor laser; a Mach-Zehnder optical modulator 111; an input buffer 112 (modulator driving circuit); an AGC (Automatic Gain Control) amplifier unit 115; a bias circuit 14; optical couplers 21, 41 and 51; an optical frequency fluctuation monitor 24 for monitoring fluctuation of optical frequency of output light; an output light power monitor 42; an extinction ratio detector 54; and a control circuit 131.

Each of the optical couplers 21, 41 and 51 splits an input light into two signals.

The power monitor 42 monitors the power of an output light signal supplied from the Mach-Zehnder optical modulator 111. The power monitor 42 is connected at an output terminal to the control circuit 131. The power monitor 42 detects the average value of light power of the transmission light (output light signal). The average value is supplied to the control circuit 131.

The extinction ratio detector 54 includes an O/E converter 52 and a peak detector 53. The O/E converter 52 is connected at an input terminal to the optical coupler 51 and at an output terminal to the peak detector 53. The peak detector 53 is connected at an output terminal to the control circuit 55. The peak detector 53 detects peak values from an output signal of the O/E converter.

The extinction ratio detector 54 detects the high and low levels of the transmission light to obtain the extinction ratio. The output of the extinction ratio detector 54 is supplied to the control circuit 131.

The control circuit 131 controls the amplitude of modulating waveform to be supplied to each of the electrodes of the Mach-Zehnder optical modulator 111 independently in response to the output signals supplied from the optical frequency fluctuation monitor 24, the power monitor 42 and the extinction ratio detector 54.

In operation, light emitted by the light source 11 is supplied to the Mach-Zehnder optical modulator 111 and is modulated. The transmission signal divided at the optical coupler 51 is supplied to the extinction ratio detector 54, in which the optical signal is converted into an electric signal by the O/E converter 52. The peak detector 53 detects the peaks (high and low levels) of the transmission light signal (optical output waveform).

The control circuit 131 calculates the extinction ratio of the transmission light in accordance with the output of the peak detector 53. The control circuit 131 controls a bias voltage and driving amplitude of the Mach-Zehnder optical modulator 111 so as that the extinction ratio keeps larger than a predetermined value. The control circuit 131 also controls bias current supplied to the light source 11 so as to stabilize the average of optical power of the transmission light.

In accordance with the duty of the transmission light, the control circuit 131 calculates the ratio between the average of high and low levels of the output light and the average of the output light. Then, in order to stabilize the average value, the control circuit 131 controls the amplitude of a driving signal and/or bias voltage to be applied to the Mach-Zehnder optical modulator 111. As a result, the duty of the transmission light is stabilized.

According to the thirteenth preferred embodiment of the present invention, the optical frequency fluctuation can be optimized without deterioration of extinction ratio and duty of the transmission light (output light signal).

According to the present invention, waveform deterioration of optical signals is sufficiently compensated. The above described improved optical transmitter and optical transmission system, according to the present invention, are applicable to an optical subscriber network system to increase the system margin. The present invention is especially useful to a system that is required to increase optical amplifiers in response to increase of transmission capacity.

As mentioned above, the present invention is not only applicable to a network for basic trunk system and an optical subscriber network system, but also to other types of optical transmission systems.

The types, number and connecting manners of each element of the invention, such as optical modulators, optical repeaters, optical couplers, filters and WDMs are not limited by any of the above described embodiments. The operating parameters for each device and control method are not limited as well.

It will be understood that the above description of the present invention is susceptible to various modifications, changes and adaptations, and the same are intended to be comprehended with the meaning and range of equivalents of the appended claims.

What is claimed is:

1. An optical transmitter, comprising:
   a light source which generates an optical carrier signal;
   an EA (Electro-Absorption) type of optical modulator which modulates the optical carrier signal in response to an applied voltage to generate an optical transmission signal;
   a bias circuit which generates a bias voltage applied to the optical modulator;
   a driver circuit which generates a driving signal supplied to the optical modulator;
   a control circuit which controls an output power of the light source and an amplitude of the driving signal supplied from the driver circuit; and
   an optical frequency fluctuation monitor which detects the amount of frequency fluctuation of the optical transmission signal, wherein
      the optical modulator is controlled so as to optimize the amount of frequency fluctuation of the optical transmission signal.

2. An optical transmitter, according to claim 1, wherein at least one of a number of parameters is regulated so as to optimize the amount of frequency fluctuation of the optical transmission signal; the parameters comprising the bias voltage, the amplitude and duty of the driving signal.

3. An optical transmitter, according to claim 1, further comprising:
   a power monitor which detects the power of the optical transmission signal; wherein
      the control circuit operates in a particular manner so that the power of the optical transmission signal does not change in response to a change of the bias voltage, applied to the optical modulator.

4. An optical transmitter, according to claim 1, further comprising:
   an extinction ratio detector which detects the extinction ratio of the optical transmission signal; wherein
      the control circuit operates in a particular manner so that the extinction ratio of the optical transmission signal does not change in response to a change of the bias voltage, applied to the optical modulator.

5. An optical transmitter, according to claim 1, wherein the control circuit controls a driving condition of the optical modulator so as to optimize the amount of frequency fluctuation of the optical transmission signal.

6. An optical transmitter, according to claim 5, wherein the control circuit controls the bias voltage applied to the optical modulator so as to stabilize the frequency fluctuation.

7. An optical transmitter, according to claim 5, wherein the driving condition comprises at least one parameter selected from the bias voltage, the amplitude and duty of the driving signal.

8. An optical transmitter, according to claim 5, further comprising:
   a power monitor which detects the power of the optical transmission signal; wherein
      the control circuit operates in a particular manner so that the power of the optical transmission signal does not change in response to a change of the bias voltage, applied to the optical modulator.

9. An optical transmitter, according to claim 5, further comprising:
   an extinction ratio detector which detects the extinction ratio of the optical transmission signal; wherein
      the control circuit operates in a particular manner so that the extinction ratio of the optical transmission signal does not change in response to a change of the bias voltage, applied to the optical modulator.

10. An optical transmitter according to claim 5, wherein the control circuit operates in a particular manner so that the duty of the optical transmission signal does not change in response to a change of the bias voltage, applied to the optical modulator.

11. An optical transmission system, comprising:
    an optical transmitter which comprises:
    (1) a light source which generates an optical carrier signal;
    (2) an EA (Electro-Absorption) type of optical modulator which modulates the optical carrier signal to generate an optical transmission signal;
    (3) a bias circuit which generates a bias voltage to be applied to the optical modulator;
    (4) a driver circuit which generate a driving signal to be supplied to the optical modulator;
    (5) a control circuit which controls an output power of the light source and an amplitude of the driving signal, supplied from the driver circuit; and
    (6) an optical frequency fluctuation monitor which detects the amount of frequency fluctuation of the optical transmission signal, wherein
       the optical modulator is controlled so as to optimize the amount of frequency fluctuation of the optical transmission signal;
    an optical receiver which is supplied with the optical transmission signal transmitted from the optical transmitter; and an optical fiber connecting the optical transmitter and the optical receiver.

12. An optical transmission system according to claim 11, wherein
the optical receiver comprises a quality monitor which monitors the transmission quality, wherein
the amount of optical frequency fluctuation of the optical transmission signal is controlled in response to the transmission quality, supplied from the quality monitor.

13. An optical transmission system according to claim 12, further comprising:
a supervisory unit which supervises transmission of the optical transmission signal, wherein
the amount of optical frequency fluctuation of the optical transmission signal is controlled through the supervisory unit in response to the transmission quality, supplied from the quality monitor.

14. An optical transmission system according to claim 11; further comprising:
a wavelength dispersion monitor which detects dispersion of the optical fiber, wherein
the amount of optical frequency fluctuation of the optical transmission signal is controlled in response to the wavelength dispersion, supplied from the wavelength dispersion monitor.

15. An optical transmission system according to claim 14, further comprising:
a supervisory unit which supervises transmission of the optical transmission signal, wherein
the amount of optical frequency fluctuation of the optical transmission signal is controlled through the supervisory unit in response to the wavelength dispersion, supplied from the wavelength dispersion monitor.

* * * * *

UNITED STATES PATENT AND TRADEMARK OFFICE
CERTIFICATE OF CORRECTION

PATENT NO. : 6,583,910 B1
DATED : June 24, 2003
INVENTOR(S) : Hideaki Satoh

It is certified that error appears in the above-identified patent and that said Letters Patent is hereby corrected as shown below:

<u>Title page,</u>
Insert item:
-- [30] Foreign Application Priority Data
April 27, 1998 [JP]     Japan ........... 10-116935 --

Signed and Sealed this

Eighteenth Day of November, 2003

JAMES E. ROGAN
*Director of the United States Patent and Trademark Office*